(12) United States Patent
Loccufier

(10) Patent No.: US 11,292,929 B2
(45) Date of Patent: Apr. 5, 2022

(54) UV CURABLE INKJET INKS

(71) Applicant: AGFA NV, Mortsel (BE)

(72) Inventor: Johan Loccufier, Mortsel (BE)

(73) Assignee: AGFA NV, Mortsei (BE)

( * ) Notice: Subject to any disclaimer, the term of this patent is extended or adjusted under 35 U.S.C. 154(b) by 16 days.

(21) Appl. No.: 15/766,869

(22) PCT Filed: Oct. 10, 2016

(86) PCT No.: PCT/EP2016/074159
§ 371 (c)(1),
(2) Date: Apr. 9, 2018

(87) PCT Pub. No.: WO2017/063983
PCT Pub. Date: Apr. 20, 2017

(65) Prior Publication Data
US 2018/0298219 A1    Oct. 18, 2018

(30) Foreign Application Priority Data
Oct. 13, 2015   (EP) ..................................... 15189614

(51) Int. Cl.
*C09D 11/38*          (2014.01)
*C09D 11/101*         (2014.01)
(Continued)

(52) U.S. Cl.
CPC ............. *C09D 11/38* (2013.01); *B41J 11/002* (2013.01); *B41M 5/502* (2013.01);
(Continued)

(58) Field of Classification Search
CPC ..... C09D 11/30; C09D 11/033; C09D 11/037; C09D 11/101; C09D 11/102; C09D 11/322; C09D 11/38; B41J 11/002; B41M 5/502
See application file for complete search history.

(56) References Cited

U.S. PATENT DOCUMENTS

| | | | |
|---|---|---|---|
| 2001/0009933 A1* | 7/2001 | Miyabayashi | C09D 11/30 523/160 |
| 2002/0065335 A1* | 5/2002 | Noguchi | C09D 4/00 522/84 |

(Continued)

FOREIGN PATENT DOCUMENTS

| | | |
|---|---|---|
| EP | 2 053 101 A1 | 4/2009 |
| EP | 2 703 457 A1 | 3/2014 |

(Continued)

OTHER PUBLICATIONS

Machine Translation of JP 2012-167246 (Year: 2012).*
(Continued)

*Primary Examiner* — Sathavaram I Reddy
(74) *Attorney, Agent, or Firm* — Leydig, Voit & Mayer, Ltd.

(57) ABSTRACT

An aqueous UV curable inkjet ink includes an aqueous medium, and capsules composed of a polymeric shell surrounding a core containing one or more polymerizable compounds having an alkyne group or an ethylenically unsaturated group, wherein the aqueous UV curable inkjet ink contains one or more photoinitiators and one or more thiol compounds having at least two thiol groups.

23 Claims, 2 Drawing Sheets

(51) Int. Cl.
  *C09D 11/322* (2014.01)
  *B41J 11/00* (2006.01)
  *B41M 5/50* (2006.01)
  *C09D 11/033* (2014.01)
  *C09D 11/037* (2014.01)
  *C09D 11/102* (2014.01)

(52) U.S. Cl.
  CPC .......... *C09D 11/033* (2013.01); *C09D 11/037* (2013.01); *C09D 11/101* (2013.01); *C09D 11/102* (2013.01); *C09D 11/322* (2013.01)

(56) References Cited

U.S. PATENT DOCUMENTS

| | | | |
|---|---|---|---|
| 2004/0131855 A1* | 7/2004 | Ganapathiappan | C09D 11/30 428/407 |
| 2007/0244219 A1* | 10/2007 | Vaidya | C09D 11/101 523/160 |
| 2011/0227992 A1* | 9/2011 | Matsumoto | C09D 11/101 347/21 |
| 2012/0225968 A1 | 9/2012 | Nakano et al. | |
| 2012/0295076 A1* | 11/2012 | Toyoda | C09D 11/101 428/195.1 |
| 2013/0053469 A1 | 2/2013 | Kappaun | |
| 2014/0002556 A1 | 1/2014 | Sato et al. | |
| 2015/0111981 A1 | 4/2015 | Fu et al. | |

FOREIGN PATENT DOCUMENTS

| | | |
|---|---|---|
| GB | 1 306 587 A | 2/1973 |
| JP | 2012167246 A * | 9/2012 |
| WO | 2006/083344 A2 | 8/2006 |

OTHER PUBLICATIONS

Official Communication issued in International Patent Application No. PCT/EP2016/074159, dated Dec. 7, 2016.

Loccufier, "UV Curable Inkjet Inks", U.S. Appl. No. 15/766,879, filed Apr. 9, 2018.

\* cited by examiner

UV CURABLE INKJET INKS

CROSS REFERENCE TO RELATED APPLICATIONS

This application is a 371 National Stage Application of PCT/EP2016/074159, filed Oct. 10, 2016. This application claims the benefit of European Application No. 15189614.9, filed Oct. 13, 2015, which is incorporated by reference herein in its entirety.

BACKGROUND OF THE INVENTION

1. Field of the Invention

The present invention relates to UV curable inkjet inks and printing methods therewith.

2. Description of the Related Art

Over the last years, offset and flexographic printing systems have increasingly been replaced by industrial inkjet printing systems due to their flexibility in use, e.g. variable data printing, and due to their enhanced reliability allowing their incorporation into production lines.

Radiation curable inkjet inks have been the preferred choice of ink because high quality images can be printed even on non-absorbing ink-receivers, such as plastic foils for food packaging.

Special UV curable inkjet inks have been developed that meet the migration limits for ink components when printing on food packaging. For example, EP 2053101 A (AGFA) discloses free radical curable liquids and inks for inkjet printing of food packaging materials comprising no initiator or otherwise one or more initiators selected from the group consisting of non-polymeric di- or multifunctional initiators, oligomeric initiators, polymeric initiators and polymerizable initiators and having a very specific polymerizable composition.

There has been some criticism that (meth)acrylates give off an unpleasant odour before and after curing, which can irritate the eyes, skin and respiratory organs.

In one approach, this criticism has been addressed by trying to replace the (meth)acrylates in the UV curable inkjet ink by other polymerizable compounds. For example, US 2013053469 A (DURST) discloses to manufacture inkjet inks by replacing (meth)acrylates by vinyl based monomers, such as vinyl esters, vinyl carbonates and vinyl carbamates. However, these monomers tend to cure much slower, causing both problems of migration and productivity loss of the printing process.

In another approach, the amount of (meth)acrylates in the UV curable inkjet ink was reduced by replacing it by water or organic solvents. For example, US 2012225968 A (SEIKO EPSON) discloses an aqueous UV curable inkjet ink including: a pigment; a water-soluble organic solvent; a surfactant; at least either of a urethane (meth)acrylate having a weight average molecular weight of 1,000 to 10,000 and a cross-linked urethane (meth)acrylate having a constitutional unit including the urethane (meth)acrylate; a compound having radical polymerizable groups; a photoradical polymerization initiator; and water. However, it was found that storage stability of such an inkjet ink was limited. An improvement for this storage stability, and also spreading of the ink on a substrate, is disclosed in US 2014002556 A (SEIKO EPSON) by including a specific polyether-modified silicone oil in the aqueous UV curable inkjet ink. However, oils do not evaporate and may deteriorate the substrate, e.g. a card board. The colorant used in both patents is a colour pigment dispersed in the aqueous phase as a self-dispersible pigment or with the aid of a polymeric dispersant.

US 2015111981 A (FU ET AL.) discloses a method of preparing UV-curable inkjet pigment ink for textile printing, in which mini-emulsion techniques are used to encapsulate monomer, photo initiator, thermal initiator and pigment in mini-emulsion particles to make a UV-curable pigment paste, and the UV-curable pigment paste is mixed with water-soluble co-solvent, surfactant and water to make a UV-curable pigment ink. It was found that to increase the monomer conversion rate in such a pigmented UV curable inkjet ink using a pigment paste that a thermal initiator had to be incorporated, which reduced the storage stability.

Hence there remains a need for improved UV curable inkjet inks that exhibit less bad odour or skin-sensitization, while maintaining good cure speed and storage stability.

SUMMARY OF THE INVENTION

In order to overcome the above problems, preferred embodiments of the present invention have been realised with an aqueous UV curable inkjet ink as defined below.

It was found that by replacing a large part of the polymerizable compounds by water and by incorporating the polymerizable compounds in capsules and performing UV curing in combination with polyfunctional thiol compounds that good storage stability and curing speed was obtained. Good physical properties, such as adhesion and scratch resistance on non-absorbing substrates, were observed.

It was found that aqueous UV curable inkjet inks were obtained have good curing speed and excellent storage stability when a self-dispersible pigment was used in the aqueous medium and especially when the colour pigment was incorporated in the core of the capsule. In the latter case this results in a mono-colloid system exhibiting higher storage stability than when the colorant was included in the aqueous medium.

By using free radical curable chemistry instead of cationically curable chemistry, the residual water from the aqueous medium after the jetting and drying did not reduce the curing speed.

Further objects and advantages of the invention will become apparent from the description hereinafter.

BRIEF DESCRIPTION OF THE DRAWINGS

In FIG. 2.a, an ink droplet (12) is jetted by an inkjet print head (6) on a substrate (10). A jetted ink droplet (13) is dried by a dryer (7) before being irradiated by an infrared radiation source (8) for opening the capsules and a UV curing device (9) to cure the polymerizable compounds that were incorporated in the core (5). In FIG. 2.b, the infrared radiation source (8) of FIG. 2.a has been omitted as a UV curing device (9), e.g. a mercury bulb, is selected that emits sufficient heat radiation for opening the capsules as well as UV curing the polymerizable compounds. In FIG. 2.c, the dryer (7) of FIG. 2.a has been omitted as the infrared radiation source (8) is capable of drying the layer and opening the capsules before a UV curing device (9) cures the polymerizable compounds flowing out of the capsules. FIG. 2.d shows the same inkjet printing mode as in FIG. 2.c except that a pre-heating device (11) is present for pre-heating the substrate (10). FIG. 2.e shows an inkjet printing mode wherein an ink droplet (12) is jetted by an inkjet print head (6) on a substrate (10). A jetted ink droplet is dried by a UV curing device (9), e.g. a mercury bulb, emitting sufficient heat radiation for opening the capsules as well as UV curing the polymerizable compounds flowing out of the capsules. FIG. 2.f shows the same inkjet printing mode as in FIG. 2.e except that a pre-heating device (11) is present for pre-heating the substrate (10).

DETAILED DESCRIPTION OF THE PREFERRED EMBODIMENTS

Figure 1:
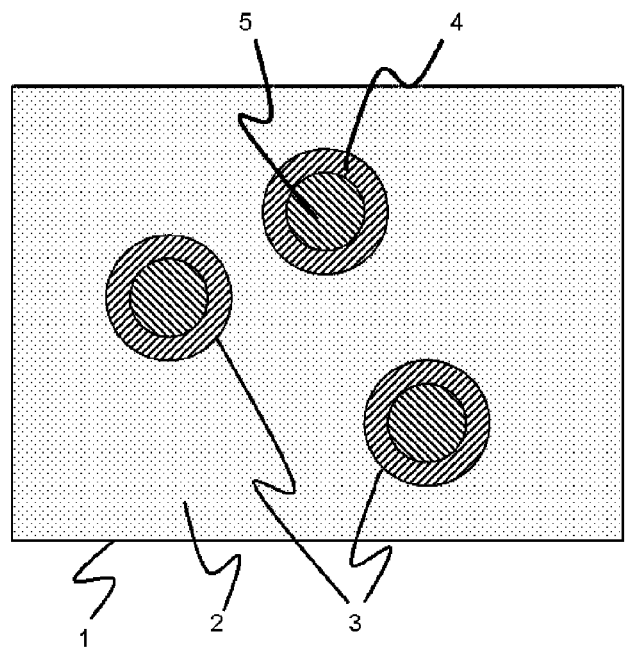
FIG. 1 shows a schematical representation of an aqueous UV curable inkjet ink (1) including an aqueous medium (2) and capsules (3) composed of a polymeric shell (4) surrounding a core (5), wherein the core contains one or more polymerizable compounds having an alkyne group or an ethylenically unsaturated group.

In an embodiment of the inkjet printing method, the UV radiation source (9) emits sufficient heat to have UV curable compounds (16) pass through the cross-linked polymeric shell (4). To check if the UV radiation source (9) emits sufficient heat, one can test if the UV cured inkjet ink cannot be removed by rubbing using a wet cloth. If this is the case, then the polymerizable compounds have polymerized not only in the core but also outside the polymeric shell. A suitable UV radiation source (9) emitting sufficient heat energy is a mercury lamp, such as a D-bulb or H-bulb.

In a preferred embodiment of the inkjet printing method, the UV radiation is emitted by UV LEDs (9). Preferably the UV LEDs (9) are combined with an infrared radiation source (8), e.g. a NIR dryer. By splitting up the thermal and UV treatment of the capsules, adhesion and image quality can be improved.

The one or more aqueous UV curable inkjet inks used in an inkjet printing method of the invention preferably include a colorant. The colorant is preferably included in the capsules, and is preferably a colour pigment, but may also be a dye or a combination of a colour pigment and a dye.

However, also an aqueous UV curable inkjet ink lacking a colorant can be advantageously exploited. In another embodiment, the inkjet printing method according to the present invention includes the steps of: a) jetting on a substrate (10), preferably a textile substrate or a leather substrate, one or more aqueous colour pigmented inkjet inks and a colourless UV curable inkjet ink (1) including capsules (3) composed of a cross-linked polymeric shell (4) surrounding a core (5), with the core (5) containing polymerizable compounds (16) and a photoinitiator (15); and b) applying UV radiation to the one or more aqueous UV curable inkjet inks (1) jetted on the substrate (10). In such a case, the colourless UV curable inkjet ink (1) immobilizes the colour pigments of the one or more aqueous colour pigmented inkjet inks. In the textile printing industry, such a liquid is also referred to as a fixing liquid. Such an inkjet printing method has an improved reliability since the coloured inkjet inks contain only a single colloid system, because the capsules as a second colloid system are in a separate inkjet liquid. Inkjet inks containing two colloid systems may exhibit inferior shelf-life stability.

Definitions

The term "monofunctional polymerizable compound" means that the polymerizable compound includes one polymerizable group.

The term "difunctional polymerizable compound" means that the polymerizable compound includes two polymerizable groups.

The term "polyfunctional polymerizable compound" means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a Ci to C6-alkyl group.

Unless otherwise specified a substituted or unsubstituted alkenyl group is preferably a Ci to C6-alkenyl group.

Unless otherwise specified a substituted or unsubstituted alkynyl group is preferably a Ci to C6-alkynyl group.

Unless otherwise specified a substituted or unsubstituted aralkyl group is preferably a phenyl or naphthyl group including one, two, three or more Ci to C6-alkyl groups.

Unless otherwise specified a substituted or unsubstituted alkaryl group is preferably a C7 to C20-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —NO$_2$.

Aqueous UV Curable Inkjet Inks

An aqueous UV curable inkjet ink (1) according to a preferred embodiment of the invention includes: a) an aqueous medium (2); and b) capsules (3) composed of a polymeric shell (4) surrounding a core (5) containing one or more polymerizable compounds having an alkyne group or an ethylenically unsaturated group; wherein the aqueous UV curable inkjet ink contains one or more photoinitiators and one or more thiol compounds having at least two thiol groups.

For UV curing the aqueous UV curable inkjet ink, a photoinitiator is present in the aqueous UV curable inkjet ink. For improving the low migration properties and minimizing skin sensitivity of the jetted ink layer, the photoinitiator is preferably a polymeric or a polymerizable photoinitiator. In a more preferred embodiment, the photoinitiator is a polymeric photoinitiator.

For enhancing the low migration properties further, a thiol compound is present in the aqueous UV curable inkjet ink. The thiol compound may be present as an inorganic pigment, e.g. a silica pigment functionalised with thiol groups and/or it may be present as a thiol molecule. The thiol molecule may be present in the aqueous medium or included in the core of the capsules.

In a preferred embodiment, the aqueous UV curable inkjet ink (1) contain capsules (3) that are dispersed in the aqueous medium (2) using a dispersing group covalently bonded to the polymeric shell (4); and wherein the dispersing group is preferably selected from the group consisting of a carboxylic acid or salt thereof, a sulfonic acid or salt thereof, a phosphoric acid ester or salt thereof, a phosphonic acid or salt thereof, an ammonium group, a sulfonium group, and a phosphonium group.

In a preferred embodiment, the aqueous UV curable inkjet ink (1) contains capsules (3) wherein the polymeric shell (4) includes a polymer selected from the group consisting of a polyamide, a melamine based polymer, a poly(urea-urethane) polymer and copolymers thereof.

The aqueous UV curable inkjet ink may be a substantially colourless liquid. Such a colourless ink can be used as a primer, e.g. on a transparent substrate where an inkjet printed colour image is viewed through the transparent substrate. It may also be applied on top of the colour inkjet image as a protective layer or as a varnish to improve the glossiness.

The aqueous UV curable inkjet ink preferably includes a colorant, which may be a dye but is preferably a pigment. The colorant may be present in the aqueous medium, but is preferably included in the core of the capsules.

In a preferred embodiment, the aqueous UV curable inkjet ink is part of an aqueous UV curable inkjet ink set, more preferably part of an aqueous UV curable inkjet ink set including a plurality of inkjet inks according to the invention. The aqueous UV curable inkjet ink set preferably includes at least a cyan aqueous UV curable inkjet ink, a magenta or red aqueous UV curable inkjet ink, a yellow aqueous UV curable inkjet ink and a black aqueous UV curable inkjet ink.

The UV curable CMYK-inkjet ink set or CRYK-inkjet ink set may also be extended with extra inks such as green, blue, brown, violet and/or orange to further enlarge the colour gamut of the image. The UV curable inkjet ink set may also be extended by the combination of one or more full density inkjet inks with light density inkjet inks. The combination of dark and light colour inks and/or black and grey inks improved the image quality by a lowered graininess.

The UV curable ink set may also include one or more spot colours, preferably one or more corporate colours, such as e.g. the red colour of Coca-Cola™.

The curable inkjet ink set preferably also includes a white aqueous UV curable inkjet ink.

Alternatively a non-CMYK or non-CRYK UV curable ink set may be composed, for example, an UV curable inkjet inkset containing a white UV curable inkjet ink and/or a black UV curable inkjet ink in combination with a red spot colour UV curable inkjet ink, e.g. of Coca-Cola™ red.

The aqueous UV curable inkjet ink set is preferably a free radical aqueous UV curable inkjet ink set.

The viscosity of an aqueous UV curable inkjet ink used in the invention is preferably smaller than 43 mPa·s at 25° C. and at a shear rate of 90 $s^{-1}$, more preferably between 2 and 24 mPa·s at 25° C. and at a shear rate of 90 $s^{-1}$.

The surface tension of an inkjet ink used in the invention is preferably in the range of 17 mN/m to 40 mN/m at 25° C., more preferably in the range of 18 mN/m to 34 mN/m at 25° C. The inkjet ink may also contain at least one surfactant for obtaining good spreading characteristics on a substrate. An aqueous inkjet ink with a surface tension smaller than 17 mN/m at 25° C. usually has to include a high amount of surfactant, which may cause problems of foaming. A surface tension greater than 40 mN/m at 25° C. often leads to insufficient spreading of the ink on a plastic foil.

A preferred aqueous UV curable inkjet ink according to the present invention includes at least:

a) 1 to 30 wt % of one or more polymerizable compounds having an alkyne group or an ethylenically unsaturated group;
b) 1 to 20 wt % a photoinitiator;
c) 1 to 30 wt % of a thiol compound including at least two thiol groups;
d) 10 to 80 wt % water;
e) 0 to 45 wt % of an organic solvent having a boiling point larger than water at 25° C. and 1 atm; and
g) 0 to 4 wt % of a surfactant;

wherein all weight percentages wt % are based on the total weight of the aqueous UV curable inkjet ink; and wherein preferably the compounds a) to b), more preferably the compounds a) to c) are substantially, preferably fully present in the core of the capsules. Substantially present in the core of the capsules means that more than 50 wt % of a compound is present in the core of the capsules.

The aqueous UV curable inkjet ink preferably has a pH higher than 7.0, more preferably a pH in the range of 8.0 to 10.0.

Capsules

The capsules have a polymeric shell surrounding a core containing one or more polymerizable compounds having an alkyne group or an ethylenically unsaturated group. The capsules are preferably present in the inkjet ink in amount of no more than 30 wt %, preferably between 5 and 25 wt % based on the total weight of the inkjet ink. It was observed that above 30 wt % jetting was not always so reliable.

The capsules have an average particle size of no more than 4 μm as determined by dynamic laser diffraction. The nozzle diameter of inkjet print heads is usually 20 to 35 μm. Reliable inkjet printing is usually possible if the average particle size of the capsules is five times smaller than the nozzle diameter. An average particle size of no more than 4 μm allows jetting by print heads having the smallest nozzle diameter of 20 μm. In a more preferred embodiment, the average particle size of the capsules is ten times smaller than the nozzle diameter. Hence preferably, the average particle size is from 0.05 to 2 μm, more preferably from 0.07 to 1 μm. When the average particle size of the capsule is smaller than 2 μm, excellent resolution and storage stability are obtained.

The capsules are preferably dispersed in the aqueous medium of the inkjet ink using a dispersing group covalently bonded to the polymeric shell. The dispersing group is preferably selected from the group consisting of a carboxylic acid or salt thereof, a sulfonic acid or salt thereof, a phosphoric acid ester or salt thereof, a phosphonic acid or salt thereof, an ammonium group, a sulfonium group, and a phosphonium group.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability of the inkjet ink is accomplished solely by electrostatic stabilization. For example, a slightly alkaline aqueous medium will turn the carboxylic acid groups covalently bonded polymeric shell may into ionic groups, where after the negatively charged capsules have no tendency to agglomerate. If sufficient dispersing groups are covalently bonded to the polymeric shell, the capsule becomes a so-called self-dispersing capsule.

These negatively or positively charged capsule surfaces can also be advantageously used during inkjet printing. For example, a second liquid containing a cationic substance, such as a compound containing ammonium groups, can be used to precipitate capsules and, if polymeric or multivalent cations are used, to bind capsules together by interaction with the dissociated carboxylic acid groups covalently bonded to the polymeric shell. By using this method an improvement in image quality can be observed due to the immobilisation of the capsules.

There is no real limitation on the type of polymer used for the polymeric shell of the capsule. Preferably, the polymer used in the polymeric shell is crosslinked. By crosslinking, more rigidity is built into the capsules allowing a broader range of temperatures and pressures for handling the capsules in both the ink making and in the inkjet printer.

Preferred examples of the polymeric shell material include polyureas, polyurethanes, polyesters, polycarbonates, polyamides, melamine based polymers and mixtures thereof, with polyureas and polyurethanes being especially preferred.

Capsules can be prepared using both chemical and physical methods. Suitable encapsulation methodologies include complex coacervation, liposome formation, spray drying and polymerization methods.

In the present invention preferably a polymerization method is used, as it allows the highest control in designing the capsules. More preferably interfacial polymerization is used to prepare the capsules used in the invention. This technique is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerisation is a particularly preferred technology for the preparation of capsules according to the present invention. In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The capsules according to the present invention are preferably prepared from an oleophilic dispersion in an aqueous continuous phase.

Typical polymeric shells, formed by interfacial polymerisation are selected from the group consisting of polyamides, typically prepared from di- or oligoamines as first shell component and di- or poly-acid chlorides as second shell component, polyurea, typically prepared from di- or oligoamines as first shell component and di- or oligoisocyanates as second shell component, polyurethanes, typically prepared from di- or oligoalcohols as first shell component and di- or oligoisocyanates as second shell component, polysulfonamides, typically prepared from di- or oligoamines as first shell component and di- or oligosulfochlorides as second shell component, polyesters, typically prepared from di- or oligoalcohols as first shell component and di- or oligo-acid chlorides as second shell component and polycarbonates, typically prepared from di- or oligoalcohols as first shell component and di- or oligo-chloroformates as second shell component. The shell can be composed of combinations of these polymers.

In a further embodiment, polymers, such as gelatine, chitosan, albumin and polyethylene imine can be used as first shell components in combination with a di- or oligo-isocyanate, a di- or oligo acid chloride, a di- or oligo-chloroformate and an epoxy resin as second shell component.

In a particularly preferred embodiment, the shell is composed of a polyurethane, a polyurea or a combination thereof. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

A water immiscible solvent is an organic solvent having low miscibility in water. Low miscibility is defined as any water solvent combination forming a two phase system at 20° C. when mixed in a one over one volume ratio.

The core contains polymerizable compounds having an alkyne group or an ethylenically unsaturated group that are usually incorporated into the capsules by dissolving it in an organic solvent having low miscibility with water and having a lower boiling point than water. A preferred organic solvent is ethyl acetate, because it also has a low flammability hazard compared to other organic solvents.

Other examples of suitable organic solvents having boiling point of lower than 100° C. include methyl ethyl ketone, ethyl ether, n-propyl ether, isopropyl ether, n-butyl methyl ether, tert-butyl methyl ether, n-butyl ethyl ether, tert-butyl ethyl ether, ethyl acetate, isopropyl acetate, and methyl propionate although they are non-limitative. In addition, each of them may be used solely or they may be used jointly by mixing them. Among those ones, ethyl acetate and methyl ethyl ketone are preferred as the organic solvent However, often the organic solvent may be omitted. For example, the organic solvent can be omitted when only liquid polymerizable compounds having an alkyne group or an ethylenically unsaturated group with a viscosity of less then 100 mPa·s are incorporated in the capsules.

The method for preparing a dispersion of capsules preferably includes the following steps:

a) preparing a non-aqueous solution of a first reactant for forming the polymeric shell and the one or more polymerizable compounds having an alkyne group or an ethylenically unsaturated group optionally in an organic solvent having a low miscibility with water and having a lower boiling point than water;

b) preparing an aqueous solution of a second reactant for forming the polymeric shell;

c) dispersing the non-aqueous solution under high shear in the aqueous solution;

d) optionally stripping the organic solvent from the mixture of the aqueous solution and the non-aqueous solution; and e) preparing a polymeric shell around the one or more polymerizable compounds having an alkyne group or an ethylenically unsaturated group by interfacial polymerization of the first and second reactants for forming the polymeric shell.

The capsule dispersion can then be completed into an inkjet ink by addition of e.g. water, humectants, surfactant and the like.

Other additives may be included into the core of the capsule such as, for example, light stabilizers, conductive particles and polymers, magnetic particles, or other compounds suitable for the specific application for which the inkjet ink is intended.

Thiol Compounds

The thiol compound having at least two thiol groups is advantageously used to perform so-called thiol-ene and/or thiol-yne click chemistry. This chemistry is known to the skilled person as illustrated by e.g. KADE, Matthew J., et al. The Power of Thiol-ene Chemistry. (A) *J. polym. sci., A, Polym. chem.* 2010, vol. 48, p. 743-750. and YAO, BiCheng, et al. Thiol-yne click polymerization. *Chinese Science Bulletin*. August 2013, vol. 58, no. 22, p. 2711-2718.

An advantage of this chemistry is that it insensitive to oxygen inhibition, which allows obtaining a high polymerization degree resulting in low migration properties. It was also observed that residual water remaining in the dried ink layer of the aqueous UV curable inkjet ink had no or minimal effect of the UV curing process of thiol-ene or thiol-yne chemistry.

Thiol-ene chemistry proceeds according to a step-growth mechanism which results in minimal shrinking. This effect is employed in the invention for enhancing adhesion to substrates, especially to non-absorbing substrates.

Furthermore on a PVC substrate it was found that a surface modification could be affected wherein the thiol compound was covalently bonded to the PVC surface, enhancing the adhesion even further as a non-bonded thiol group was available for reaction with a polymer, an oligomer or a monomer having ethylenically unsaturated polymerizable groups.

The thiol compound may be present as a thiol molecule or as a thiol pigment, i.e. an inorganic pigment having its surface functionalized with thiol groups. A combination of thiol molecules and thiol pigments may also be used in the aqueous UV curable inkjet ink.

If the thiol compound is present as a thiol molecule, then it may be present in the aqueous medium and/or incorporated in the core of the capsules. A thiol pigment is preferably present in the aqueous medium of the aqueous UV curable inkjet ink.

In a preferred embodiment, the thiol compound includes a thiol group which is converted to a thiolate group, such as a potassium thiolate group or a sodium thiolate group. Such a compound is capable of performing a surface modification of a PVC substrate as shown in FIG. 4 at a temperature of 60° C., which is a temperature obtainable in the inkjet printer during drying when using e.g. infrared light, such as a NIR-dryer or a CIR-dryer. The thiolate group may also be formed in-situ by adjustment of the pH of the aqueous UV curable inkjet ink. The chemical reaction that occurs on the PVC substrate is as follows:

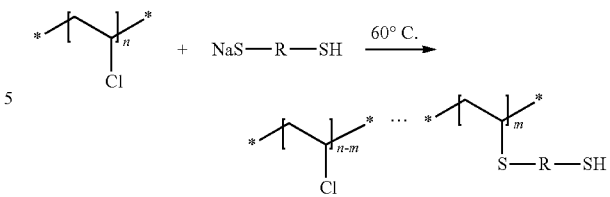

wherein R represents an optionally substituted alkylene group, an optionally substituted alkenylene group, an optionally substituted alkynylene group, an optionally substituted alkarylene group, an optionally substituted aralkylene group, an optionally substituted arylene or heteroarylene group, an ester containing aliphatic linking group, an ether containing aliphatic linking group and a silane containing aliphatic linking group or combinations thereof. The result is that a thiol compound covalently bonded to the PVC surface is available for reaction in a thiol-ene or a thiol-yne click chemistry.

The thiol compound may also be present as an oligomer or a polymer. Preferred thiol oligomers and polymers include urethanes, polyesters, polyethers, polycarbonates, poly-carbamates, polyureas and corresponding straight-chain oligomers.

In a preferred embodiment, the aqueous UV curable inkjet ink includes 0.1 to 25% by weight of the thiol compound, more preferably 1 to 20% by weight and most preferably 3 to 15% by weight all based on the total weight of the aqueous UV curable inkjet ink.

In a preferred embodiment, the aqueous UV curable inkjet ink includes the thiol compounds and the polymerizable compounds in an amount such that the ratio of "the number of thiol groups" over "the number of ethylenically unsaturated polymerizable groups and alkyne groups" is in the range of 0.25:1 to 4:1, preferably in the range of 0.5:1 to 2:1 and most preferably the ratio is about 1.

In a preferred embodiment of the aqueous UV curable inkjet ink, the thiol compound including at least two thiol groups is a compound containing a secondary thiol group.

In a preferred embodiment of the aqueous UV curable inkjet ink, the thiol compound including at least two thiol groups is an inorganic pigment surface modified with thiol groups.

In a preferred embodiment of the aqueous UV curable inkjet ink, the thiol compound including at least two thiol groups is a silicon-based thiol compound.

Thiol Molecules

The thiol molecule includes at least two thiol groups. Preferred thiol molecules include two to six thiol groups, preferably three to five thiol groups, and most preferably four thiol groups.

The thiol molecule is preferably a compound comprising an aliphatic thiol.

In a preferred embodiment, the thiol molecule is represented by Formula (I):

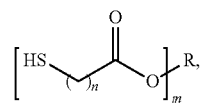

Formula (I)

wherein n represents an integer from 1 to 4; m represents an integer from 2 to 6; and R represents an m-valent linking group comprising at most 20 carbon atoms.

In a preferred embodiment n represents 1 or 2.

In a preferred embodiment m represents 3 or 4.

In a more preferred embodiment n represents 1 or 2 and m represents an integer from 2 to 6. In the most preferred embodiment n represents 1 or 2 and m represents 3 or 4.

In a preferred embodiment, the thiol compound has a molecular weight smaller than 1,000 Dalton, more preferably the thiol compound has a molecular weight smaller than 500 Dalton.

Particularly preferred primary thiol molecules include tetra(ethylene glycol) dithiol (CAS 2781-02-4), glykol di(3-mercaptopropionate) (CAS 22504-50-3), glyceryl dithioglycolate (CAS 63657-12-5), glycol dimercaptoacetate (CAS 123-81-9), trimethylolpropane trimercaptoacetate (CAS 10193-96-1), pentaerythritol tetramercaptoacetate (CAS 10193-99-4), glykol di(3-mercaptopropionate) (CAS 22504-50-3), trimethylolpropane tri(3-mercaptopropionate) (CAS 33007-83-9), pentaerythritol tetra(3-mercaptopropionate) (CAS 7575-23-7), dipentaerythritol hexa(3-mercaptopropionate) (CAS 25359-71-1), ethoxylated-trimethylolpropane tri-3-mercaptopropionate (CAS 345352-19-4), and tris[2-(3-mercaptopropionyloxy)ethyl]isocyanurate (CAS 36196-44-8).

The above and other thiol molecules are commercially available, e.g. as Thiocure™ grades from Bruno Bock Chemische Fabrik GmbH & Co. KG.

Suitable thiol molecules include 1,1,1-trimethylolpropane tris(3-mercaptopropyl)ether, 1,2,4-tris(2-mercaptoethyl)cyclohexane, tri(3-mercaptopropyl) trimetylolpropane and others disclosed by WO 2011/004255 A (KUROS BIOSURGERY).

It was found that thiol molecules having secondary thiol groups exhibited less odour than thiol molecules having only primary thiol groups. Hence, the thiol molecule preferably includes at least two secondary thiol groups, more preferably the thiol molecule includes two to six secondary thiol groups, preferably three to five secondary thiol groups, and most preferably four secondary thiol groups.

A particularly preferred thiol molecule having secondary thiol groups is pentaerythritol tetrakis (3-mercaptobutylate). The latter is available as Omnimer™ PE1 from IGM RESINS and Karenz MT™ PE1 from SHOWA DENKO.

For minimizing odour of an aqueous UV curable inkjet ink, especially after UV curing, the molar ratio of thiol molecules having primary thiol groups over thiol compounds having at least one secondary thiol group is preferably 0 to 4, more preferably the molar ratio is 0, meaning that the thiol molecules in the aqueous UV curable inkjet ink consist of thiol molecules containing at least one secondary thiol group. For calculating the molar ratio, a thiol molecule having primary thiol groups is considered to have only primary thiol groups, while thiol molecules containing at least one secondary thiol group may also include primary thiol groups.

In the most preferred embodiment, the thiol molecules consist of thiol molecules containing only secondary thiol groups.

For improving mechanical performance and limited potential for water uptake, leachables and degradation, the thiol molecules are preferably ester-free thiol molecules.

Particularly preferred ester-free thiol molecules are silane based thiol molecules and siloxane based thiol molecules. Such compounds can easily be synthesized by reacting thioacetic acid with functional alkenes to give thioester derivatives that can be hydrolyzed under alkaline or acidic conditions.

Suitable silane based thiol molecules and siloxane based thiol molecules are disclosed by WO 2011/004255 A (KUROS BIOSURGERY), especially those in the examples 1 to 6.

A preferred example of a silane based thiol molecule for use in the aqueous UV curable inkjet ink is tetra(3-mercaptopropyl)silane, which synthesis is described in Example 5 of WO 2011/004255 A (KUROS BIOSURGERY).

A preferred example of a siloxane based thiol molecule for use in the aqueous UV curable inkjet ink is 2,4,6,8-tetra(2-mercaptoethyl)-2,4,6,8-tetramethylcyclotetrasiloxane, which synthesis is described in Example 4 of WO 2011/004255 A (KUROS BIOSURGERY).

More preferably silane based thiol molecules and siloxane based thiol molecules including secondary thiol groups are used in the aqueous UV curable inkjet ink according to the invention. Such thiol molecules not only improve mechanical properties, but also reduce the odour problem.

A preferred example of a silane based thiol molecule containing secondary thiol groups is the compound represented by the formula TH-1:

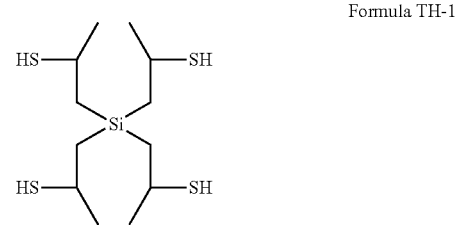 [SMILES: CC(S)C[Si](CC(C)S)(CC(C)S)CC(C)S]

Formula TH-1

The synthesis of TH-1 may be performed in a multi-step reaction. In the first step, hydrogen bromide is reacted with tetraallylsilane to give tetrakis(2-bromopropyl)silane. The latter is converted with thiourea to its isothiouronium salt, which is then hydrolyzed with aqueous sodium hydroxide to give TH-1.

For further improving low migration properties bulky thiol molecules may be used. Preferred bulky thiol molecules which may be included in the aqueous medium of the UV curable inkjet ink are so-called polyhedral oligomeric silsesquioxanes (POSS) represented by the following empirical formula $[R(SiO_{1.5})]n$ (n=4, 6, 8, 10, 12, 14, 16 and larger) that have specific cage structures such as represented in Table 1 by formulae POSS-1 to POSS-3 or partial cage structures such as represented by formula POSS-4. R1 to R12 represent hydrogen as well as inorganic or organic substituents, but at least two of the R1 to R12 groups include a thiol group, preferably a secondary thiol group.

TABLE 1

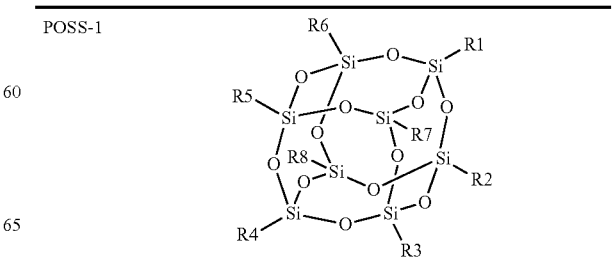

POSS-1

TABLE 1-continued

POSS-2
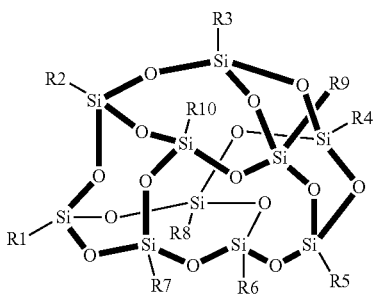

POSS-3
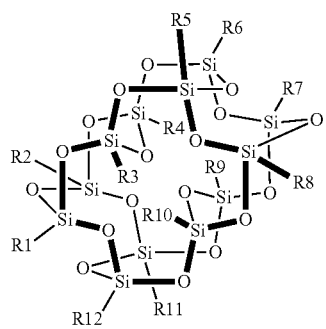

POSS-4
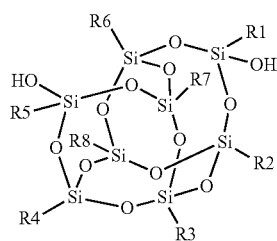

In the above thiol molecules POSS-1 to POSS-4, R1 to R12 each independently represent a hydrogen, an alkyl group, an alkenyl group, an alkynyl group, an aralkyl group, an alkaryl group and an aryl group, with the proviso that at least two of the R1 to R12 groups include a thiol group, preferably a secondary thiol group. The thiol group may be selected from an alkyl mercaptan group containing 1 to 6 carbon atoms and an aryl mercaptan, preferably a thiophenol.

A particularly preferred thiol molecule having a polyhedral oligomeric silsesquioxane structure is represented by POSS-5:

POSS-5
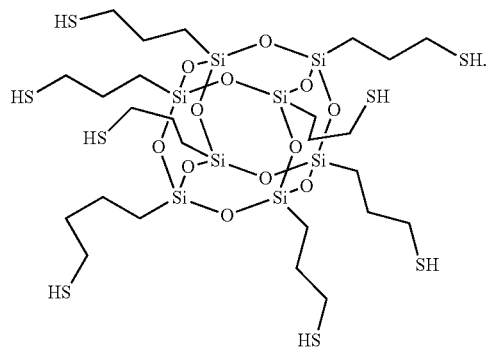

The structures and synthesis of silsesquioxanes have been discussed in more detail by R. Baney et al. in Chemical Review, 1995, 95, 1409-1430 as well as in the references cited therein and by Guizhi Li et al. in Journal of Inorganic and Organometallic Polymers, Vol. 11 (3), September 2001, page 123-154 as well as in the references cited therein. Silsesquioxanes with specific cage structures have been designated as polyhedral oligomeric silsesquioxanes, POSS. Such cage structures are described in Journal of Inorganic and Organometallic Polymers, Vol. 11 (3), September 2001, page 124, Scheme 1 (structures c-f).

An important benefit of polyhedral oligomeric silsesquioxanes is that it affords the material formulations with excellent thermal, mechanical and oxidative stability, as well as flammability resistance. This is largely due to the inorganic core of the POSS molecules.

Silsesquioxanes (POSS) containing thiol groups can be obtained from companies such as Hybrid Plastics, Fountain Valley, Calif. 92708-6117, USA.

Thiol Pigments

The thiol compound may also be a so-called thiol pigment. A thiol pigment is an inorganic pigment, such as a silica pigment or a titanium dioxide pigment, which surface has been functionalized with two or more thiol groups.

Silica nanoparticles are preferred because they are usually small-sized, monodisperse and can be easily surface-modified. A monodisperse distribution is advantageous for the transparency of printed colour inks, thus enlarging the colour gamut.

Thiol groups are preferably introduced on the surface using an alkoxysilane containing a thiol group. Typical examples of siloxanes containing a thiol are 3-mercapotopropyl triethoxysilane, 3-mercaptopropyl trimethoxysilane, 2-mercaptoethyl triethoxysilane, 4-mercaptobutyl triethoxysilane, 2-mercaptopropyl trimethoxysilane and 3-mercaptobutyl trimethoxysilane. A preferred alkoxysilane containing a thiol group is 3-mercaptopropyl trimethoxysilane (MPTMS).

An example of a suitable synthesis scheme for a thiol pigment is as follows: a dry phase deposition method was used to functionalize silica particles (e.g. Ludox™ TM-50 from GRACE having an average particle size of about 22 nm). The silica particles were dispersed in anhydrous ethanol (15 mL of ethanol per gram of silica) and MPTMS (available from ALDRICH) was added such that the ratio of the amount of silica (in g) to the amount of MPTMS (in mL) was 3:7. Ultra high purity grade nitrogen was bubbled through the mixture to evaporate the ethanol under fume hood, thus depositing MPTMS on the surface of the silica. For the silanization reaction, the silica was then placed in oven at 120° C. for 9 hours. The material was allowed to cool and washed twice with 50 mL of anhydrous ethanol to remove any physically adsorbed MPTMS and dried again in oven. The silica was analyzed using FTIR to verify the MPTMS deposition on the silica surface.

The number of thiol groups on the thiol pigment surface can be easily modified as desired as long as at least two thiol groups are present. However, usually a large number of thiol groups is present on the pigment surface, preferably more than ten thiol groups, more preferably even more than twenty or fifty thiol groups.

A commercially available thiol pigment having an average particle size of 2.2 μm is Aktisil™ MM mercapto modified from HOFMANN MINERAL.

The average particle size of the thiol pigment as measured according to ISO 13320-1 is preferably between 10 nm and 2.5 µm, more preferably between 15 nm and 250 nm, and most preferably between 20 nm and 150 nm.

If an inorganic pigment is used as thiol pigment, an improved scratch resistance and reduced tackiness of the ink layer is observed.

Due to its higher molecular weight per unit, it is not necessary to include secondary thiol groups for improvement of the odour. In fact preferably primary thiol groups are included because of their greater reactivity in thiol-ene and thiol-yne click chemistry.

Photoinitiators and Co-Initiators

The aqueous UV curable inkjet ink contains a photoinitiator. The photoinitiator is preferably a polymerizable photoinitiator or a polymeric photoinitiator. One or more photoinitiators may be included in the aqueous UV curable inkjet ink of the invention. They may be dissolved or dispersed in the aqueous medium of the aqueous UV curable inkjet ink, but preferably they are incorporated into the core of the capsules. By including the one or more photoinitiators, preferably the one or more polymeric or polymerizable photoinitiators, into the core of the capsules, the properties of low migration are usually enhanced.

The photoinitiator or photoinitiating system preferably consists of one or more free radical photoinitiators, optionally completed by co-initiators or polymerization synergists. Two types of free radical photoinitiators can be distinguished and used in the inkjet inks of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4, 4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For certain applications such as food packaging, the photoinitiator is preferably a so-called diffusion hindered photoinitiator. A diffusion hindered photoinitiator is a photoinitiator which exhibits a much lower mobility in a cured layer of the aqueous UV curable inkjet ink than a monofunctional photoinitiator, such as benzophenone. Several methods can be used to lower the mobility of the photoinitiator. One way is to increase the molecular weight of the photoinitiator so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators. The diffusion hindered photoinitiator is preferably selected from the group consisting of multifunctional photoinitiators, oligomeric photoinitiators, polymeric photoinitiators and polymerizable photoinitiators. Most preferably the diffusion hindered photoinitiator is a polymerizable initiator or a polymeric photoinitiator.

Suitable diffusion hindered photoinitiators are also those disclosed in EP 2053101 A (AGFA) in paragraphs [0074] and for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

In order to increase the photosensitivity further, the free radical curable inkjet ink may additionally contain co-initiators. Suitable examples of co-initiators can be categorized in three groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethylacrylate). The preferred co-initiators are aminobenzoates.

The one or more co-initiators included into the aqueous UV curable inkjet ink are preferably diffusion hindered co-initiators for safety reasons. A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators.

For applications such a textiles where skin sensitization and skin irritation is to be avoided, preferably polymerizable photoinitiators are used that include one or more polymerizable groups differing from (meth)acrylate groups. Preferred polymerizable photoinitiators include an alkynyl group and/or a vinylcarbonate group as polymerizable group. Preferred polymerizable photoinitiators are those disclosed in WO 2015/031927 (DURST), especially those disclosed in Tables 1 to 5.

Particularly preferred are photoinitiators including an alkynyl group and/or a vinylcarbonate group as polymerizable group and including a thioxanthone group or an acylphosphine oxide group, as these polymerizable photoinitiators allow for UV curing by UV LEDs, having a wavelength larger than 370 nm. Preferred polymerizable thioxanthone photoinitiators include the examples 21, 22, 23, 24, 25, 26 and 27 in Table 1; the examples 42, 43 and 53 in Table 2; the example 56 in Table 3; and the example 77, 78, 79, 80, 81 and 82 in Table 4 of WO 2015/031927 (DURST).

Preferred polymerizable acylphosphine oxide photoinitiators include the examples 97, 98, 99, 100, 101, 102, 103, 104, 105, 106, 107, 108, 109, 110, 111, 112, 114 disclosed in WO 2015/031927 (DURST).

For preventing bad odour, the most preferred acylphosphine oxide photoinitiators are those having a polymerizable group on each mesitaldehyde group of the acylphosphine oxide photoinitiator.

Particularly preferred acylphosphine oxide photoinitiators are the compounds 108, 109, 110, 111, 112, 113 and 114 disclosed in WO 2015/031927 (DURST).

A preferred amount of the one or more free radical photoinitiators is 0.1-30 wt %, more preferably 0.3-20 wt %, and most preferably 0.5-15 wt % of the total weight of the aqueous UV curable inkjet ink.

The aqueous UV curable inkjet ink preferably comprises a co-initiator in an amount of 0.1 to 50 wt %, more preferably in an amount of 0.5 to 25 wt %, most preferably in an amount of 1 to 10 wt % of the total weight of the aqueous UV curable inkjet ink.

Polymerizable Compounds

The aqueous UV curable inkjet ink (1) includes capsules (3) composed of a polymeric shell (4) surrounding a core (5) containing one or more polymerizable compounds having an alkyne group or an ethylenically unsaturated group. Although polymerizable compounds may be included in the aqueous medium (2) of the aqueous UV curable inkjet ink (1), preferably all the polymerizable compounds having an alkyne group or an ethylenically unsaturated groupare included in the core of the capsulesd for improving the low migration properties of the ink.

Any polymerizable compound commonly known in the art may be employed, but preferably only small amounts (up to 5 or 10 wt % based on the inkjet ink) and more preferably no acrylates or methacrylates are employed. A combination of monomers, oligomers and polymers may be used. The monomers, oligomers and polymers may possess different degrees of functionality, and a mixture including combinations of mono-, di-, tri- and higher functionality monomers, oligomers and/or polymers may be used.

For certain applications, such as food packaging applications, the amount of monofunctional monomers, oligomers and/or polymers is preferably no more than 0 to 10 wt % based on the total weight of polymerizable compounds.

Suitable monomers and oligomers are preferably selected from a group comprising or consisting of acrylates, methacrylates, vinyls, acrylamides, methacrylamides, vinyl carbonates, vinyl ethers, vinyl esters, vinyl carbamates, allyl ethers, allyl esters and their corresponding alkyne compounds. More preferably the monomers and oligomers are selected from a group comprising or consisting of vinyls, acrylamides, methacrylamides, vinyl carbonates, vinyl ethers, vinyl esters, vinyl carbamates, allyl ethers, allyl esters and their corresponding alkyne compounds. Particularly preferred are polymerizable compounds including allyl ether groups, vinyl carbonate groups and alkyne groups.

Synthesis of such monomers is disclosed in the relevant literature, for example in HURD, Charles D. Vinylation and the Formation of Acylals. *Journal Am. Chem. Soc.* 1956, vol. 78, no. 1, p. 104_106; LOBELL, M., et al. Synthesis of hydroxycarboxylic acid vinyl esters. *MP Synthesis*. 1994, vol. 4, p. 375-377; LEE, T. Y., et al. Synthesis, Initiation, and Polymerization of Photoinitiating Monomer. *Macromolecules*. 2005, vol. 38, no. 18, p. 7529-7531; ATTA, A. M., et al. New vinyl ester resins based on rosin for coating applications. *React. Funct. Polym.* 2006, vol. 66, p. 1596-1608; WO 01/00634 A (WRIGHT CHEM CORP); and ROHR, Markus, et al. Solvent-free ruthenium-catalysed vinylcarbamate synthesis from phenylacetylene and diethylamine in 'supercritical' carbon dioxide. *Green Chemistry*. 2001, vol. 3, p. 123-125.

Preferred compounds for the synthesis of the above functional monomer include ethylene glycols; propylene glycols; neopentylglycols; 1,1'-methylene-di (2-naphthol); 1,1,1-tris (4-hydroxyphenyl) ethane; 1,14-tetradecanediol; 1, 2,4-benzenetriol; 1,2-benzenedimethanol; 1,2-decanediol; 1,2-pentanediol; 1,2-tetradecanediol; 1,3-dioxane-5,5-dimethanol; 1,3-propanediol; 1,4-bis (2-hydroxyisopropyl) benzene; 1, 5-hexadiene-3,4-diol; 1,6-dihydroxy naphthalene; 1, 6-hexane diol; 1-(2-nitrophenyl)-1,2-ethanediol; 1-(benzyloxymethyl) tri (ethylene glycol); 1-[N,N-bis (2-hydroxyethyl)amino]-2-propanol; 2,2'-(o-phenylenedioxy) diethanol; 2,2' biphenyldimethanol; 2,2'-bipyridine-3,3'-diol; 2,2, 3,3,4,4,5, 5-octafluoro-1, 6-hexanediol; 2,2,4-trimethyl-1,3-pentanediol; 2,2-bis (bromomethyl)-1,3 propanediol; 2,2-bis (hydroxymethyl) butyric acid; 2,3,5,6-tetramethyl-p-xylene-a,a'-diol; 2,3-dibromo-1,4-butanediol; 2,3-dichloro-5,8-dihydroxy-1,4-naphthoquinone; 2,4-dimethyl-2,4-pentanediol; 2,5-dibromohydroquinone; 2,5-dihydroxy-1,4-benzoquinone; 2,5-dimethylresorcinol; 2,6-dihydroxy-4-methyl-3-pyridinecarbonitrile; 2,7-dimethyl-3,5-octadiyne-2,7-diol; 2-(bromomethyl)-2-(hydroxymethyl)-1, 3-propanediol; 2-benzyloxy-1,3-propanediol; 2-hydroxyethyl disulfide; 2-hydroxymethyl-1,3-propanediol; 2-methyl-1,3-propanediol; 2-methylene-1, 3-propanediol; 2-nitroresorcinol; 2-phenyl-1,2-propanediol; 3',5'-dihydroxyacetophenone; 3,3'-(ethylenedioxy) diphenol; 3,3,3', 3'-tetramethyl-1,1'-spirobiindane-5,5', 6,6'-tetraol; 3,3-dimethyl-1,2-butanediol, 3-(4-methoxyphenoxy)-1,2-propanediol; 3-bromo-1,2-propanediol; 3-cyclohexene-1,1-dimethanol; 3-ethoxy-1,2-propanediol; 3-fluorocatechol; 3-hexyne-2,5-diol; 3-methoxy-1,2-propanediol; 3-methyl-1, 3,5-pentanetriol; 3-morpholino-1,2-propanediol; 3-phenoxy-1,2-propanediol; 3-piperidin-1,2-propanediol; 4,4'-dihydroxybenzophenone; 4,4'-isopropylidene-bis[2-(2,6-dibromophenoxy) ethanol]; 4,4'-isopropylidenedicyclohexanol; 4,6-dinitropyrogallol; 4-amino-4-(3-hydroxypropyl)-1,7-heptanediol; 4-bromo-3, 5-dihydroxybenzoic acid; 4-tert-butylcalix[4]arene; 5-chloro-2,3-pyridinediol; 7,8-dihydroxy-6-methoxycoumarin; 7-octene-1,2-diol, anthrarufin; bis (2-hydroxyethyl) terephthalate; chlorohydroquinon; di(trimethylolpropane), diethyl 2,5-dihydroxyterephthalate; diethyl bis (hydroxymethyl) malonate; hydrobenzoin; hydroquinone-bis (2-hydroxyethyl) ether; methyl 3,4,5-trihydroxybenzoate; N,N,N', N'-tetrakis (2-hydroxypropyl) ethylenediamine; nitromethantrispropanol; pentaerythritol; tetrafluorohydroquinone; triisopropanolamine; 1,3,5-cyclohexanetriol; 1, 2-cyclopentanediol; tert-butylhydroquinone; 1,2-cyclohexanediol; 1,4-dioxane-2,3-diol; 2,3-dibromo-2-butene-1, 4-diol; trans-p-menth-6-ene-2,8-diol; 2,2'-biphenol, 3,3', 5,5'-tetrabromobisphenol A; 4,4'-(1,3-phenylenediisopropylidene) bisphenol; 4,4'-(1,4-phenylene diisopropylidene) bisphenol; 4,4'-(1-phenylethylidene) bisphenol; 4,4'-(9-fluorenylidene) diphenol; 4,4'-(hexafluoroisopropylidene) diphenol; 4,4'-cyclohexylidene bisphenol; 4,4'-ethylidenebisphenol; 4,4'-isopropylidenebis (2,6-dimethylphenol); 4,4'-dihydroxybiphenyl; 4,4'-methylenebis (2,6-di-tert-butylphenol); 4,4'-sulfonylbis (2-methylphenol); 4,4'-sulfonyldiphenol; 4,4'-thiodiphenol; bis[4-(2-hydroxyethoxy) phenyl] sulfone; bisphenol A; ethoxylated bisphenol A; propoxylated bisphenol A; bisphenol C; 1,2,4,5 benzentetracarboxamide; 1,2-diaminocyclohexane; 1,3-cyclohexanebis(methylamine); 1,4-diaminoanthraquinone; 1,5-diamino-2-methylpentane; 1,9-diaminononane; 2,2'-(ethylenedioxy) bis(ethylamine); 2,2-dimethyl-1, 3-propanediamine; 2,3,5, 6-tetramethyl-p-phenylenediamine; 2,4,6-trimethyl-m-phenylenediamine; 2,4,8, 10-tetraoxaspiro [5.5] undecane 3,9-dipropanamine; 2,4-diaminotoluene; 2,5-dichloro-p-phenylenediamine; 2,5-dimethyl-1,4-phenylenediamine; 2,6-diaminopurine; 2,6-diaminotoluene; 2-aminophenyl disulfide; 3,3'-methylenedianiline; 3,4'-oxydianiline; 3, 4-diaminobenzophenone; 4,4'-(1,1'-biphenyl-4,4'-diyldioxy) dianiline; 4,4'-(1,3-phenylenediisopropylidene) bisaniline; 4,4'(1,3-phenylenedioxy) dianiline; 4,4'-(1,4-phenylenediisopropylidene) bisaniline; 4,4'-(4,4'-isopropylidene dendiphenyl-1,1'-diyldioxy)dianiline; 4,4'-(hexafluoroisopropylidene) bis (p-phenylene-oxy) dianiline; 4,4'-(hexafluoroisopropylidene) dianiline; 4,4'-diaminobenzophenone; 4,4'-diaminooctafluorobiphenyl; 4,4'-methylenebis(cyclohexylamine); 4,4'-diaminobenzanilide; 4,4'-methylene-bis (2-chloroaniline); 4,4'-methylenebis (2,6-diethylaniline); 4,4'-methylenebis (2,6-dimethylaniline); 4,7,10-trioxa-1,13-tridecanediamine; 4,9-dioxa-1,12-dodecanediamine; 4-aminophenyl, 4-chloro-o-phenylenediamine; 5,5'-(hexafluoroisopropylidene) di-o-toluidine; 6-chloro-3,5-diamino-2-pyrazinecarboxamide; DYTEK®-EP-diamine; poly(1,4-butanediol) bis (4-aminobenzoate); tris (2-aminoethyl) amine; p-xylylenediamine; 1,4,8,11-tetraazacy-5,7-dione; 1,4,8,12-tetraazacyclopentadecane; 1,5,9 triazacyclododecane; N,N'-diisopropyl-1, 3-propanediamine; N,N'-diisopropylethylenediamine; N,N'-diphenyl-p-phenylenediamine; N,N'-diethyl-2-butene-1,4-diamine; N,N'-dimethyl-1,3-propanediamine; 1-[bis[3-(dimethylamino)propyl]amino]-2-propanol; 2-[2-(dimethylamino) ethoxy] ethanol; 1,1-cyclohexanediacetic acid, 1,2,3,4-butane tetracarboxylic acid; 1,2,3-triazole-4,5-dicarboxylic acid; 1,3,5-cyclohexanetricarboxylic; 1,3 acetonedicarboxylic; 1,3-adamantanediacetic acid; 1,3-cyclohexane dicarboxylic acid; 1,4-naphthalene dicarboxylic acid; 1,4-phenylenedipropionic, 2,2'-bipyridine-4,4'-dicarboxylic acid; 2,2'-Iminodibenzoic acid, 2,3-dibrombutandicarboxylic acid; 2,5-dihydroxyterephthalic acid, 2,6-dimethyl-3,5-pyridinedicarboxylic acid; 2,6-naphthalene dicarboxylic acid; 2-(2-methoxyethoxy) acetic acid, 2-bromoterephthalic acid; 2-methoxyisophthalic acid; 2-[2-(2-methoxyethoxy) ethoxy] acetic acid; 3-fluorophthalic acid; 3-phenylglutaric acid; 3-thiophenmalonic acid; 4,4'-oxybis (benzoic acid), 4,4' sulfonyldibenzoic acid, 4,5-dichlorophthalic acid; 4-methylphthalic acid; 5-(octadecyloxy) isophthalic acid; 5-tert butylisophthalic acid; 6-methyl-2,3-dicarboxylic acid; 1,7-heptanedicarboxylic acid; benzyl malonic acid; biphenyl-4,4'-dicarboxylic acid; bis (carboxymethyl) trithiocarbonate; butylmalonic acid; chlorobutandiacid; cyclohexylbutandiacid; dibromomaleinic acid; diethylmalonic acid; dodecandiacid; ethylmalonic acid; hexadecandiacid; 2-methyl-2-butenediacid; perfluoroglutaric acid; phenylmalonic acid; terephtalic acid; tetrafluorophthalic acid; undecanediacid, p-terphenyl 4,4"dicarboxylic acid; 1,6-hexanediacid; etc. can be used.

The aqueous UV free radical curable inkjet ink according to the present invention preferably includes one or more polymerizable compounds selected from a group comprising or consisting of vinyls, vinyl carbonates, vinyl ethers, vinyl esters, vinyl carbamates, allyl ethers, allyl esters and alkyne compounds.

Preferred polymerizable oligomers and polymers are urethanes, polyesters, polyethers, polycarbonates, poly-carbamates, polyureas and straight-chain oligomers having the following polymerizable groups: acrylate, methacrylate, vinyl, acrylamide, methacrylamide, vinyl carbonate, vinyl ether, vinylester-vinyl carbamate groups, as well as their corresponding alkyne compounds.

Particularly preferred monomers are selected from the group consisting of di- or oligofunctional allylethers, di- or oligofunctional allyl esters, di- or oligofunctional vinyl ethers, di- or oligofunctional vinyl esters and di- or oligofunctional norbornene derivatives. Typical allyl ethers can be selected from pentaerythritol tetraallyl ether, glycerol triallyl ether, 1,6-hexane diol diallyl ether, cyclohexane dimethanol diallyl ether, trimethylolpropane triallyl ether, dipentaerythritol hexaallyl ether and ethoxylated and propoxylated derivatives thereof. Typical vinylethers can be selected from pentaerythritol tetravinyl ether, glycerol trivinyl ether, 1,6-hexane diol divinyl ether, cyclohexane dimethanol divinyl ether, trimethylolpropane trivinyl ether, dipentaerythritol hexavinyl ether and ethoxylated and propoxylated derivatives thereof. Typical allyl esters can be selected from adipic acid diallyl ester, terephtalic acid diallyl ester, trimellitic acid triallyl ester, pyromellitic acid tetraallyl ester, citric acid triallyl ester and glutaric acid diallyl ester. Typical vinyl esters can be selected from adipic acid divinyl ester, terephtalic acid divinyl ester, trimellitic acid trivinyl ester, pyromellitic acid tetravinyl ester, citric acid trivinyl ester and glutaric acid divinyl ester.

Thiol-yne chemistry has been described as an extension for thiol-ene chemistry to design crosslinked networks with a higher crosslinking density and glass transition temperature in comparison with thiol-ene based networks. The chemistry has recently been reviewed by Lowe et al. (Journal of Materials Chemistry, 20, 4745-4750 (2010)) and by Hoogenboom R. (Angew. Chem. Int. Ed. 49, 3415-3417 (2010)).

Optionally photochemically induced radical double addition of polyfunctional thiol compounds to di- or multifunctional alkynes is the basis of thiol-yne chemistry. In principle any di- or multifunctional alkyne, including polymeric alkynes, can be used in combination with any di- or polyfunctional thiol compound.

In a preferred embodiment, at least one of the alkyne functions in the di- or polyfunctional alkynes is represented by H—C≡C—*, where * represents the covalent bond to the rest of the di- or polyfunctional alkyne.

In a more preferred embodiment, all of the alkyne groups in the di- or polyfunctional alkyne are represented by H—C≡C—*.

In an even more preferred embodiment, the alkyne functions in said di- or polyfunctional alkyne is selected from the group consisting of a propargyl ether, a propargyl ester, a propargyl urethane, a propargyl ureum, a propargyl carbonate, a propargyl amide, a propargyl thioether and a propargyl amine. In a further preferred embodiment, said alkyne group is selected from the group consisting of a propargyl ether, a propargyl ester and propargyl urethane, a propargyl ester and a propargyl urethane being particularly preferred.

Typical examples of di- and polyfunctional alkynes are given by Table 2 without being limited thereto.

TABLE 2
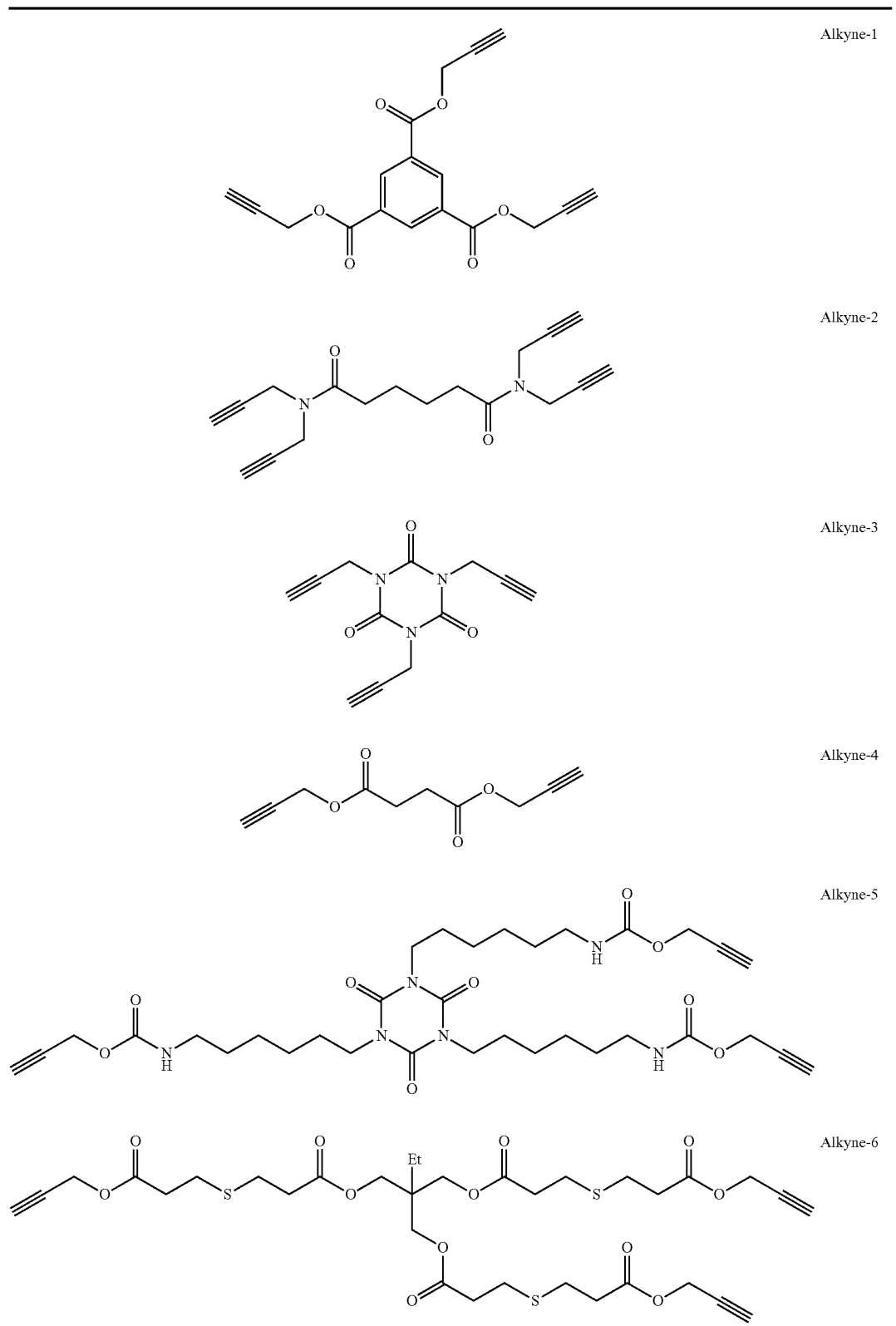

TABLE 2-continued
| | |
|---|---|
| 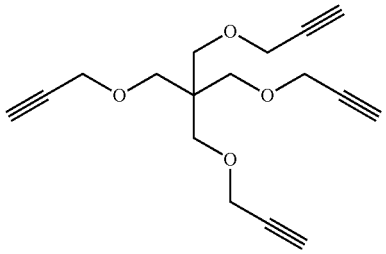 [SMILES: C#CCOCC(COCC#C)(COCC#C)COCC#C] | Alkyne-7 |
| 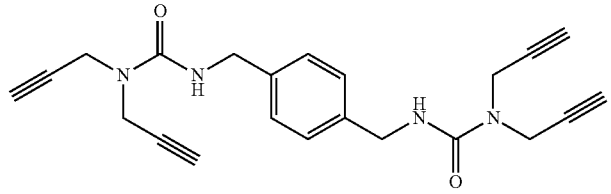 [SMILES: C#CCN(CC#C)C(=O)NCc1ccc(CNC(=O)N(CC#C)CC#C)cc1] | Alkyne-8 |
| 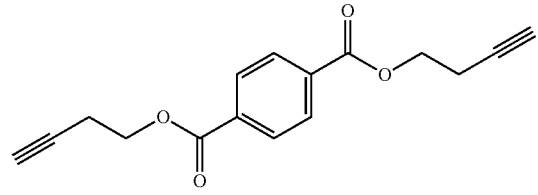 [SMILES: C#CCCOC(=O)c1ccc(C(=O)OCCC#C)cc1] | Alkyne-9 |
| 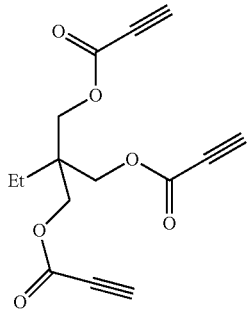 [SMILES: C#CC(=O)OCC(CC)(COC(=O)C#C)COC(=O)C#C] | Alkyne-10 |
| 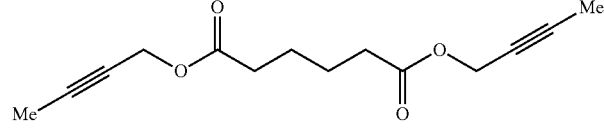 [SMILES: CC#CCOC(=O)CCCCC(=O)OCC#CC] | Alkyne-11 |
| 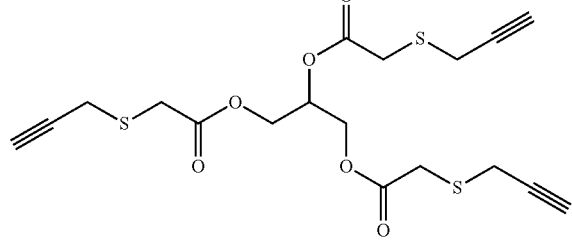 | Alkyne-12 |
| 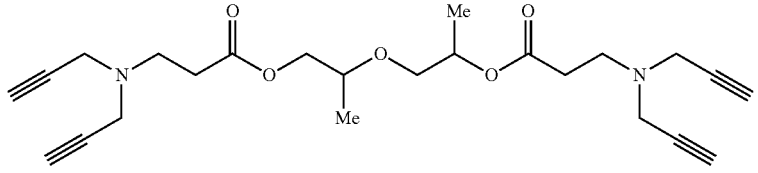 [SMILES: C#CCN(CC#C)CCC(=O)OCC(C)OCC(C)OC(=O)CCN(CC#C)CC#C] | Alkyne-13 |

TABLE 2-continued

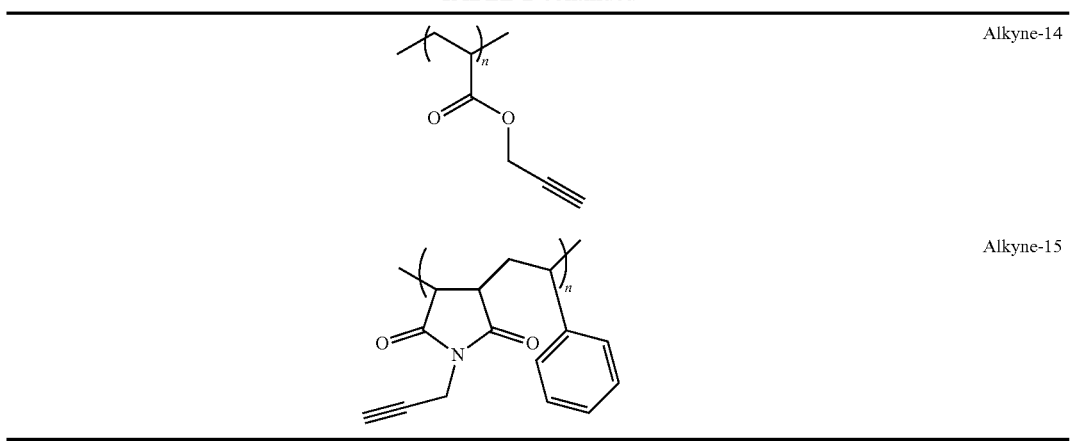

In the aqueous UV curable inkjet ink (1), preferably in the core (5) of the capsules (3), a polymer may be incorporated including monomeric units that allow for crosslinking of the polymer when UV curing the aqueous UV curable inkjet ink on a substrate.

Such a polymer preferably includes at least one monomeric unit selected from the group consisting of butadiene, chloroprene, dicyclopentadiene, ethylene norbornene and isoprene. Typical polymers comprising a monomer unit selected from the group consisting of butadiene, chloroprene, dicyclopentadiene, ethylene norbornene and isoprene include EPDM rubbers, optionally carboxylated nitrile butadiene rubbers, isobutylene isoprene rubbers, ABS, polybutadienes, polyisoprenes and chloroprene rubbers.

In a preferred embodiment, the polymer is a liquid. Commercially available liquid polybutadienes are available as Lithene™ grades from SYNTHOMER. Particularly preferred polybutadienes have an average molecular weight Mn smaller than 10,000. A particularly preferred liquid polybutadiene is Lithene™ PM4 having an average molecular weight Mn of about 1,500.

In a preferred embodiment, the polymer used in the core of the capsules is a maleinised polybutadiene. Preferred commercial examples of a maleinised polybutadiene include Lithene™ N4 5000 15MA, Lithene™ N4 B 10 MA and Lithene™ PM 4 7.5 MA from SYNTHOMER. The maleinised polybutadiene preferably has an average molecular weight Mn smaller than 10,000 and preferably includes 5 to 20 wt % of maleic anhydride units based on the weight of the maleinised polybutadiene.

If the polymer is present in the aqueous medium, then it is preferably present as a latex. The preparation of a latex is well-known to the skilled person and are readily commercially available. Both latexes based on addition polymers, prepared by classical emulsion polymerisation, such as acrylate based latexes and latexes based on polycondensation polymers such as poly(urethane) and poly(ester) based latexes can be used. The latexes preferably contain ethylenically unsaturated groups or alkyne groups in the backbone or in the side chains. Particularly preferred latexes are butadiene or isoprene based polymers.

Particularly preferred latex particles are prepared from a copolymer includes styrene and butadiene as monomeric units, and preferably consists of styrene and butadiene as monomeric units. A commercially available styrene-butadiene latex is HPX393 from Styron Europe Gmbh.

The latex preferably has a glass transition temperature (Tg) of no more than 70° C., more preferably no more than 50° C.

The minimum film-forming temperature (MFT) of the polymer latex is preferably between −50 and 70° C., more preferably between −40 and 50° C.

The average particle size of the latex particles in the inkjet ink is preferably less than 300 nm, more preferably less than 200 nm as measured by laser diffraction, e.g. using a Beckman Coulter™ LS 13320.

In a preferred embodiment, the aqueous UV curable inkjet ink includes 1 to 30% by weight of polymerizable compounds, more preferably 3 to 25% by weight and most preferably 5 to 15% by weight all based on the total weight of the aqueous UV curable inkjet ink.

Polymerizable Pigments

The aqueous UV curable inkjet ink (1) may, preferably in the aqueous medium (2), also include an inorganic pigment having on its surface ethylenically unsaturated polymerizable groups or alkyne groups.

A polymerizable pigment is a pigment, preferably an inorganic pigment, such as a silica pigment or a titanium dioxide pigment, which surface has been functionalized with alkyne groups or ethylenically unsaturated polymerizable groups.

Silica nanoparticles are preferred because they are usually small-sized, monodisperse and can be easily surface-modified. A monodisperse distribution is advantageous for the transparency of printed colour inks, thus enlarging the colour gamut.

Ethylenically unsaturated polymerizable groups and alkyne groups can be introduced on the surface using a alkoxysilane containing an ethylenically unsaturated polymerizable group or an alkyne group, using synthesis methods similar to those described for the thiol pigment above. Typical alkoxysilanes containing an ethylenically unsaturated group or an alkyne group can be selected from the group consisting of trimethoxy-2-propen-1-yl-silane, 1-ethenyl-4-(trimethoxysilyl)-benzene, trimethoxy-7-octen-1-yl-silane, trimethoxy-5-hexen-1-yl-silane, [3-(ethenyloxy)propyl] trimethoxysilane, trimethoxy-[3-(2-propen-lyloxy) propyl] silane and vinyltriethoxysilane (VIES). A particularly preferred silane containing an ethylenically unsaturated polymerizable group is vinyltriethoxysilane (VIES).

The number of polymerizable groups on the polymerizable pigment surface can be easily modified as desired as long as at least two polymerizable groups are present.

However, usually a large number of polymerizable groups is present on the pigment surface, preferably more than ten polymerizable groups, more preferably even more than twenty or fifty polymerizable groups.

A commercially available polymerizable pigment having an average particle size of 2.2 μm is Aktisil™ VM56 vinyl modified from HOFMANN MINERAL.

The average particle size of the polymerizable pigment as measured according to ISO 13320-1 is preferably between 10 nm and 2.5 μm, more preferably between 15 nm and 250 nm, and most preferably between 20 nm and 150 nm.

If an inorganic pigment is used as polymerizable pigment, an improved scratch resistance and reduced tackiness of the ink layer is observed.

In a preferred embodiment, the aqueous UV curable inkjet ink includes 0.5 to 30% by weight of the polymerizable pigment, more preferably 1 to 25% by weight and most preferably 2.5 to 20% by weight all based on the total weight of the aqueous UV curable inkjet ink.

Polymerization Inhibitors

The aqueous UV curable inkjet ink may contain a polymerization inhibitor, preferably in the core of the capsules. Suitable polymerization inhibitors include phenol type antioxidants, hindered amine light stabilizers, phosphor type antioxidants, hydroquinone monomethyl ether, hydroquinone, t-butylcatechol, 2,6-di-tert.butyl-4-methylphenol (=BHT) and pyrogallol.

The inhibitor is preferably a polymerizable inhibitor.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total aqueous UV curable inkjet ink.

Inorganic Pigments

The aqueous UV curable inkjet ink may contain an inorganic pigment to improve the scratch resistance. Inorganic pigments can preferably be selected from the group consisting of titanium dioxide nanoparticles, aluminium oxide nanoparticles, zinc oxide nanoparticles and silicium dioxide nanoparticles.

The inorganic pigments preferably have an average particle size smaller than 100 nm, more preferably smaller than 50 nm.

Silica nanoparticles are preferred because they are usually small-sized and monodisperse. A monodisperse distribution is advantageous for the transparency of printed colour inks, thus enlarging the colour gamut.

The average particle size of inorganic pigment particles is preferably determined with a Brookhaven Instruments Particle Sizer BI90plus based upon the principle of dynamic light scattering.

Colorants

The colorant in the aqueous UV curable inkjet ink may be a dye but is preferably a colour pigment, as dyes tend to deteriorate during UV curing and generally exhibit a poor light fastness, which is important for some specific applications, e.g. inkjet printed textiles.

The colour pigment may be present in the aqueous medium or incorporated in the core of the capsules. For incorporating the colour pigment into the core of the capsules, preferably first a dispersion is made of the colour pigment by using a polymeric dispersant.

The colour pigments may be black, cyan, magenta, yellow, red, orange, violet, blue, green, brown, mixtures thereof, and the like. Any colour pigment may be chosen, such as from those disclosed by HERBST, Willy, et al. Industrial Organic Pigments, Production, Properties, Applications. 3rd edition. Wiley—VCH, 2004. ISBN 3527305769.

The colour pigment may be dispersed using a polymeric dispersant and optionally a dispersion synergist, or may be of the self-dispersible type.

A self-dispersible colour pigment can be dispersed without a polymeric dispersant in the aqueous medium. Dispersion stability of a self-dispersible pigment is accomplished by electrostatic stabilization. The advantage of using self-dispersible colour pigments is that any possible interaction of the polymeric dispersant with the capsules of the aqueous UV curable inkjet ink is eliminated when the capsules include a dispersing group covalently bonded to the polymeric shell, especially when the dispersing group is selected from the group consisting of a carboxylic acid or salt thereof, a sulfonic acid or salt thereof, a phosphoric acid ester or salt thereof, a phosphonic acid or salt thereof, an ammonium group, a sulfonium group, and a phosphonium group.

The technology for making self-dispersible pigments is well-known. For example, EP 1220879 A (CABOT) discloses pigments having attached a) at least one steric group and b) at least one organic ionic group and at least one amphiphilic counterion, wherein the amphiphilic counterion has a charge opposite to that of the organic ionic group that are suitable for inkjet inks. Also EP 906371 A (CABOT) discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

A particularly preferred self-dispersible colour pigment for a cyan aqueous inkjet ink is a β-copper phthalocyanine pigment, more preferably C.I. Pigment Blue 15:3 or C.I. Pigment Blue 15:4.

Particularly preferred self-dispersible colour pigments for a red aqueous inkjet ink are C.I Pigment Red 254 and C.I. Pigment Red 122, and mixed crystals thereof.

Particularly preferred self-dispersible colour pigments for yellow aqueous inkjet ink are C.I Pigment Yellow 151, C.I Pigment Yellow 155 and C.I. Pigment Yellow 74, and mixed crystals thereof.

For the black ink, the self-dispersible colour pigment is preferably a carbon black pigment.

The colour pigment may also be dispersed using a polymeric dispersant, especially when they are to be incorporated in the core of the capsules. In the latter case the colour pigment may be dispersed in an organic solvent having a low miscibility with water and having a lower boiling point than water, but preferably it is dispersed in the one or more polymerizable compounds having an alkyne group or an ethylenically unsaturated group that will be incorporated in the core of the capsules.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polymeric dispersity PD smaller than 2, more preferably smaller than 1.75 and most preferably smaller than 1.5.

Commercial examples of polymeric dispersants are the following:
- DISPERBYK™ dispersants available from BYK CHEMIE GMBH;
- SOLSPERSE™ dispersants available from NOVEON;
- TEGO™ DISPERS™ dispersants from DEGUSSA;
- EDAPLAN™ dispersants from MÜNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Particularly preferred for non-aqueous ink jet inks include Solsperse™ dispersants from NOVEON, Efka™ dispersants from CIBA SPECIALTY CHEMICALS INC and Disperbyk™ dispersants from BYK CHEMIE GMBH.

Particularly preferred dispersants for solvent based pigment dispersions are Solsperse™ 32000 and 39000 from NOVEON.

The polymeric dispersant is preferably used in the pigment dispersion in an amount of 2 to 600 wt %, more preferably 5 to 200 wt % based on the weight of the pigment.

In a particularly preferred embodiment, the polymeric dispersant is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

Suitable commercial pigment dispersions for the aqueous UV curable inkjet ink are D71 and D75 cyan, magenta, yellow and black dispersions from Diamond Dispersions In a preferred embodiment, the polymeric dispersant is crosslinked on the colour pigment surface so that it is practically prevented from desorption of the colour pigment surface. Such technology is known, for example, from WO 2014/106729 A (FUJIFILM).

Commercially available aqueous pigment dispersions having a cross-linked polymeric dispersant suitable for the aqueous UV curable inkjet ink include Pro-Jet™ APD 1000 yellow, magenta, cyan and black from FUJIFILM Imaging Colorants.

As colour pigments also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

Also mixtures of pigments may be used. For example, the inkjet ink includes a carbon black pigment and at least one pigment selected from the group consisting of a blue pigment, a cyan pigment, magenta pigment and a red pigment. It was found that such a black inkjet ink allowed easier and better colour management.

The pigment particles in the aqueous UV curable inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the aqueous UV curable inkjet ink should be between 0.05 µm and 2 µm. Preferably the average pigment particle size is between 0.06 µm and 1 µm, more preferably between 0.07 and 1 µm, particularly preferably between 0.08 and 0.5 µm and most preferably between 0.08 and 0.15 µm.

The average particle size of colour pigment particles is preferably determined with a Brookhaven Instruments Particle Sizer BI90plus based upon the principle of dynamic light scattering. The ink is preferably diluted to a pigment concentration of 0.002 wt %.

The colour pigment is used in the aqueous UV curable inkjet ink in an amount of 0.1 to 20 wt %, preferably 1 to 10 wt %, and most preferably 2 to 5 wt % based on the total weight of the pigmented aqueous UV curable inkjet ink. A pigment concentration of at least 2 wt % is preferred to reduce the amount of inkjet ink needed to produce the colour pattern, while a pigment concentration higher than 10 wt % tends to reduce the colour gamut for printing the colour pattern with print heads having a nozzle diameter of 20 to 50 µm.

A white aqueous UV curable inkjet ink preferably includes a pigment with a high refractive index, preferably a refractive index greater than 1.60, preferably greater than 2.00, more preferably greater than 2.50 and most preferably greater than 2.60. Such white pigments generally have a very high covering power, i.e. a limited amount of white ink is necessary to hide the colour and defects of the substrate. The most preferred white pigment is titanium dioxide.

The white inkjet ink preferably contains the white pigment in an amount of 5 wt % to 30 wt %, more preferably 8 to 25 wt % of white pigment based upon the total weight of the white inkjet ink.

The numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. A suitable particle size analyzer used was a Malvern™ nano-S available from Goffin-Meyvis.

Aqueous Medium

The capsules are dispersed into an aqueous medium. The aqueous medium may consist of water, but preferably includes one or more organic solvents.

Other compounds, such as e.g. surfactants, colorants, alkaline compounds and light stabilizers, may be dissolved or dispersed in the aqueous medium.

The one or more organic solvents may be added for a variety of reasons. For example, it can be advantageous to add a small amount of an organic solvent to improve the dissolution of a compound in the aqueous medium.

The aqueous medium may contain an organic solvent as humectant to prevent the clogging of the nozzle, due to its ability to slow down the evaporation rate of inkjet ink, especially the water in the inkjet ink. The humectant is an organic solvent having a higher boiling point than water.

The aqueous medium may further comprise at least one thickener for viscosity regulation in the inkjet ink.

Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly(acrylic acid), poly(vinyl alcohol), partially hydrolyzed poly(vinyl acetate), poly(hydroxyethyl acrylate), poly(methyl vinyl ether), polyvinylpyrrolidone, poly (2-vinylpyridine), poly(4-vinylpyridine) and poly(diallyldimethylammonium chloride).

The thickener is added preferably in an amount of 0.01 to 20 wt %, more preferably 0.1 to 10 wt % based on the inkjet ink.

Humectants

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are 2-pyrrolidone, glycerol and 1,2-hexanediol, since the latter were found to be the most effective for improving inkjet printing reliability in an industrial environment.

The humectant is preferably added to the inkjet ink formulation in an amount of 0.1 to 35 wt % of the formulation, more preferably 1 to 30 wt % of the formulation, and most preferably 3 to 25 wt % of the formulation.

Opthothermal Converting Agents

The aqueous UV curable inkjet ink may contain an optothermal converting agent for the conversion of electromagnetic radiation into heat when the inkjet printed image is exposed to an infrared light source, such as a laser, a laser diode or a LED.

The presence of an optothermal converting agent allows for faster drying.

The optothermal converting agent may be any suitable compound absorbing in the wavelength range of emission by the infrared light source.

The optothermal converting agent is preferably an infrared dye as this allows easy handling into the inkjet ink. The infrared dye may be included in the core of the capsules, but is preferably included in the aqueous medium. In the latter, the heat transfer is usually much more effective.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis(chalcogenopyrylo)polymethine dyes, oxyindolizine dyes, bis (aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

The one or more optothermal converting agents are preferably present in the range of 0.1 to 10 wt % based on the total weight of the inkjet ink.

Surfactants

The aqueous UV free radical curable inkjet ink may contain at least one surfactant. The surfactant(s) can be anionic, cationic, non-ionic, or zwitter-ionic and are usually added in a total quantity less than 2 wt % based on the total weight of the inkjet ink and particularly in a total less than 1 wt % based on the total weight of the inkjet ink.

In a particular preferred embodiment, the aqueous UV free radical curable inkjet ink may contains an ionic surfactant, such as Alkanol™ XC from DUPONT.

Suitable surfactants for the aqueous UV free radical curable inkjet ink include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOLTN 104, 104H, 440, 465 and TG available from AIR PRODUCTS & CHEMICALS INC.).

Preferred surfactants are selected from fluoro surfactants and/or silicone surfactants.

Particularly preferred commercial fluorosurfactants are Capstone™ FS3100 from DU PONT, Tivida™ FL2500 from MERCK and Thetawet™ FS8150 from NEOCHEM GMBH.

The aqueous UV free radical curable inkjet ink preferably does not contain a silicon oil, such as a polyether-modified silicone oil.

pH-Adjusters

The aqueous UV curable inkjet ink may contain at least one pH adjuster. Suitable pH adjusters include NaOH, KOH, $NEt_3$, $NH_3$, HCl, $HNO_3$, $H_2SO_4$ and (poly)alkanolamines such as triethanolamine and 2-amino-2-methyl-1-propanol. Preferred pH adjusters are triethanol amine, NaOH and $H_2SO_4$.

The aqueous UV curable inkjet ink has a pH of preferably larger than 7.0, more preferably a pH between 7.5 and 12.0, most preferably between 8.0 and 11.0.

Stabilizers

The aqueous UV curable inkjet ink according to the present invention may further comprise at least one antioxidant for improving the storage stability of an image.

As the antioxidant for improving storage stability of an image, various organic and metal complex type fading preventives can be used in the invention. Organic fading preventives include hydroquinones, alkoxyphenols, dialkoxyphenols, phenols, anilines, amines, indanes, coumarones, alkoxyanilines and heterocycles, while metal complexes include nickel complexes and zinc complexes. More specifically, compounds as described in "Research Disclosure, No. 17643, VII, Section I or J, No. 15162, No. 18716, left column on page 650, No. 36544, page 527, No. 307105, page 872, and the patent cited in No. 15162, and compounds embraced in the formula of the typical compounds and compound examples described on pages 127 to 137 of JP 62215272 A (FUJI).

The stabilizer is added in an amount of 0.1 to 30 wt %, preferably 1 to 10 wt % based on the total weight of the aqueous UV curable inkjet ink.

Biocides

A biocide may be added to the aqueous medium to prevent unwanted microbial growth, which may occur in the ink-jet ink over time. The biocide may be used either singly or in combination.

Suitable biocides for the aqueous UV curable inkjet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the aqueous UV curable inkjet ink.

Manufacturing of Inkjet Inks

A self-dispersible colour pigment can be simply mixed into the ink. If the colour pigment is not of the self-dispersible type, a colour pigment dispersion is first prepared. A colour pigment dispersion may be prepared by precipitating or milling the colour pigment in the dispersion medium in the presence of a polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the aqueous UV curable inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients will vary widely depending upon the specific materials and the intended applications. The contents of a milling mixture comprise the mill grind and the milling media. The mill grind comprises pigment, dispersant and a liquid carrier such as water. The pigment is usually present in the mill grind at 1 to 50 wt %, excluding the milling media. The weight ratio of pigment over dispersant is preferably 20:1 to 1:2.

The milling time can vary widely and depends upon the pigment, the selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the colour pigment dispersion in the form of a concentrated mill grind, which is subsequently diluted to the appropriate concentration for use in the ink-jet printing system. This technique permits preparation of a greater quantity of aqueous UV curable inkjet ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application.

Inkjet Printing Methods

An inkjet printing method according to a preferred embodiment of the present invention includes, in order, at least the steps of:

a) jetting one or more aqueous UV free radical curable inkjet inks according to any one of claims 1 to 10 on a substrate;

b) applying heat and/or infrared light to the aqueous UV free radical curable inkjet ink jetted on the substrate; and c) applying UV light to the aqueous UV free radical curable inkjet ink jetted on the substrate.

In a particularly preferred embodiment of the inkjet printing method, the infrared red light from a NIR or a SWIR source is used in step b) and UV light from UV LEDs is used in step c).

In a preferred embodiment, the substrate used in the inkjet printing method is a polyvinylchloride substrate having its surface modified by the thiol compound present in the aqueous UV curable inkjet ink.

In a preferred embodiment of the inkjet printing method, the heat and/or infrared light applied in step b) is applied in such a manner, e.g. by a low-temperature, high-air-throughput, that surface temperature of the substrate does not exceed 50° C., preferably does not exceed 40° C.

Substrates

There is no real limitation on the type of substrate for inkjet printing the aqueous UV curable inkjet ink of the invention on. The substrates may have ceramic, metallic, glass, wood, paper or polymeric surfaces for printing. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment of the inkjet printing method, the substrate is selected from textile, glass, pharmaceutical and food packaging.

In a preferred embodiment of the inkjet printing method, the substrate is a rigid medium selected from rigid PVC, paperboard, corrugated and wood.

In a preferred embodiment of the inkjet printing method, the substrate is substrate suitable for soft signage applications, such as banners, posters, POP/POS displays, indoor wall graphics, tradeshow displays, parasols, flags, outdoor advertising and backdrops.

A major advantage of the current aqueous UV curable inkjet ink in textile inkjet printing is that not only a wide range of textiles can be printed upon, but that after the UV curing no post-treatments are necessary. For example, a classic washing process to remove dyes that are unfixed from the textile is not necessary. In addition, also many pre-treatments of textiles can be avoided. For example, where classic textile inkjet printing processes require the application of a water-soluble polymer to the textile prior to inkjet printing in order to prevent ink bleeding, this is usually not necessary with the aqueous UV curable inkjet ink of the present invention. The avoidance of these pre- and post treatment speed-up and simplify the manufacturing of inkjet printed textiles, resulting in an economical bonus. For example, no cumbersome ink swaps have to be performed in the inkjet printer, when changing the type of textile substrate. Also waste generated in the post-treatment can be avoided.

Suitable textiles can be made from many materials. These materials come from four main sources: animal (e.g. wool, silk), plant (e.g. cotton, flax, jute), mineral (e.g. asbestos, glass fibre), and synthetic (e.g. nylon, polyester, acrylic). Depending on the type of material, it can be woven or non-woven textile.

The textile substrate is preferably selected from the group consisting of cotton textiles, silk textiles, flax textiles, jute textiles, hemp textiles, modal textiles, bamboo fibre textiles, pineapple fibre textiles, basalt fibre textiles, ramie textiles, polyester based textiles, acrylic based textiles, glass fibre textiles, aramid fibre textiles, polyurethane textiles (e.g. Spandex or Lycra™), Tyvek™ and mixtures thereof.

Suitable polyester textile includes polyethylene terephthalate textile, cation dyeable polyester textile, acetate textile, diacetate textile, triacetate textile, polylactic acid textile and the like.

Applications of these textiles include automotive textiles, canvas, banners, flags, interior decoration, clothing, hats, shoes, floor mats, doormats, brushes, mattresses, mattress covers, linings, sacking, stage curtains, flame-retardant and protective fabrics, and the like. Polyester fibre is used in all types of clothing, either alone or blended with fibres such as cotton. Aramid fibre (e.g. Twaron) is used for flame-retardant clothing, cut-protection, and armor. Acrylic is a fibre used to imitate wools.

The inkjet inks of the invention are also suitable for inkjet printing on leather.

A preferred substrate for inkjet is printing the inkjet inks of the invention on is a metallic substrate, preferably an aluminium substrate.

Inkjet Printing Devices

The aqueous UV curable inkjet ink may be jetted by one or more print heads ejecting small droplets of ink in a controlled manner through nozzles onto an ink-receiver surface, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

For enhancing the reliability of the inkjet printing process, the aqueous UV curable inkjet ink is preferably jetted using a through flow print head, more preferably through flow piezoelectric print head. By using a through flow print head, the sedimentation of the colour pigment or the capsules in the aqueous UV curable inkjet ink is effectively prevented. The recirculation of the aqueous UV curable inkjet ink causes enough agitation to keep the colour pigment and the capsules well-dispersed.

The inkjet printing device preferably includes in order a thermal curing device and a UV curing device.

In a preferred embodiment, the drop size of the aqueous UV curable inkjet ink is smaller than 12 pL, preferably smaller than 10 pL and most preferably smaller than 8 pL.

In a preferred embodiment, the inkjet printing device is a so-called roll-to-roll inkjet printer, preferably including more than 8 through flow print heads having a nozzle plate longer than 4 cm. The nozzle plate is preferably provided with a non-wetting coating.

Thermal Curing Devices

The inkjet device contains a thermal curing device for removing water and organic solvents in the inkjet printed image. The thermal curing device may consist out of different units.

A pre-heating device may be included in the inkjet printing device for heating the substrate prior to jetting. The pre-heating device may be an infrared radiation source as described here below, or may be a heat conduction device, such as a hot plate or a heat drum. A preferred heat drum is an induction heat drum.

The thermal curing device may include a dryer. Suitable dryers include devices circulating hot air, ovens, and devices using air suction. However for reducing energy consumption, preferably infrared radiation sources are used for thermal curing.

Preferred infrared radiation sources include near infrared radiation sources (NIR: 750-1400 nm) and short wave infrared radiation sources (SWIR: 1400-3000 nm). An advantage is that glass lenses, which may be included in the curing device for focusing the infrared light on the substrate, transmit in this infrared region, contrary to mid-wavelength infrared light (MWIR: 3000-8000 nm) or long-wavelength infrared light (LWIR: 8000-15000 nm).

The most preferred infrared light source is a SWIR light source because the water absorption significantly increases at 1450 nm.

A commercial example of a SWIR light source is a carbon infrared emitter CIR™ available from HERAEUS, for example emitting at a wavelength of about 2000 nm.

Another preferred thermal curing device is a NIR source emitting near infrared radiation. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

A commercially available NIR emitters are available from ADPHOS.

The thermal curing device may be, preferably at least in part, arranged in combination with the print head of the inkjet printer, travelling therewith so that the curing radiation is applied very shortly after jetting. This allows pinning the aqueous UV free radical curable inkjet ink when jetted on the substrate.

UV Curing Devices

The inkjet printing device includes also a UV curing device emitting UV radiation which is adsorbed by the photoinitiator or photoinitiating system of the aqueous UV curable inkjet ink for starting the polymerization reaction.

The UV curing device may be a so-called cold UV lamp, such as UV LEDs, but may also emit so much heat radiation, e.g. a high or low pressure mercury lamp, that it is also able to remove water and organic solvents in the inkjet printed image.

After drying, an aqueous UV curable inkjet ink is cured by exposure to ultraviolet radiation. The curing means may consist out of UV LEDs, because such an arrangement is advantageous for energy consumption compared to mercury lamps. The source of UV radiation may be an elongated radiation source extending transversely across the substrate to be cured.

Any ultraviolet light source, as long as part of the emitted light can be absorbed by the photoinitiator or photoinitiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
- UV-A: 400 nm to 320 nm
- UV-B: 320 nm to 290 nm
- UV-C: 290 nm to 100 nm.

In a preferred embodiment, the inkjet printing device contains UV LEDs with a wavelength larger than 360 nm, preferably UV LEDs with a wavelength larger than 380 nm, and most preferably UV LEDs with a wavelength of about 395 nm.

In a preferred embodiment, the inkjet printing device including a plurality of the aqueous UV curable inkjet inks of the invention is an inkjet device lacking a mercury lamp.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages for obtaining a fast curing speed and a high curing degree.

By using a thiol compound in the aqueous UV curable inkjet ink, the inkjet printing device does not require one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. The thiol compound allows executing thiol-ene or thiol-yne click chemistry, which is insensitive to oxygen inhibition contrary to the conventional (meth)acrylate chemistry. The reason is that a hydroperoxy radical formed by the presence of oxygen can abstract a labile hydrogen from a thiol compound so that the thiol radical can still add to e.g. an acrylate monomer, while the hydroperoxy radical does not initiate the acrylate polymerization.

In a preferred embodiment, the inkjet printing device including a plurality of the aqueous UV curable inkjet inks of the invention is an inkjet device lacking an oxygen depletion unit.

EXAMPLES

Materials

All materials used in the following examples were readily available from standard sources such as Sigma-Aldrich (Belgium) and Acros (Belgium) unless otherwise specified. The water used in the examples was demineralised water.

D110N is Takenate™ D110N, a trifunctional aromatic isocyanate, supplied by MITSUI as a 75 w % solution in ethyl acetate.

ITX is Speedcure™ ITX, a mixture of isopropyl thioxanthone isomers, supplied by Lambson Specialty Chemicals.

APE is pentaerythritol tetraallyl ether, supplied by PERSTORP.

TPO-L is 2,4,6-trimethylbenzoylphenylethoxyphosphine oxide, supplied by IGM Resins BV as Omnirad™ TPO-L.

EHA is 2-ethylhexyl-4-(dimethylamino)benzoate, supplied by Rahn AG as Genocure™ EHA.

Irgacure™ 379 is 2-(dimethylamino)-2-[(4-methylphenyl)methyl]-1-[4-(4-morpholinyl)-phenyl]-1-butanone, supplied by BASF.

ACP 70 is Lakeland™ ACP 70, an amphoteric surfactant supplied by Lakeland Laboratories LTD.

L-lysine was supplied by Aldrich.

E1010 is Olfine™ E1010, an antifoam compound supplied by Shin-Etsu Chemical Company LTD.

THIO-1 is DL-dithiothreitol, supplied by ALDRICH.

CYAN-1 is Cab-o-Jet™ 450, a self-dispersible cyan pigment dispersion available from CABOT.

Measurement Methods

1. Average Size of Capsules

The average size of the capsules in a dispersion was measured using a Zeta-Sizer™ Nano-S (Malvern Instruments, Goffin Meyvis).

2. Dry Rub Resistance

The dry rub resistance was evaluated by scratching each of the samples for 30 times using a Q-tip. The damage of the coating was evaluated visually and scored in accordance with a criterion described by Table 3.

TABLE 3

| Evaluation value | Criterion |
|---|---|
| 0 | no visual damage |
| 1 | minor surface damage. |
| 2 | clear surface damage |
| 3 | damage in the depth of the coating |
| 4 | complete removal of the coating |

Example 1

This example illustrates the preparation and properties of an aqueous UV curable inkjet ink in accordance with the invention, wherein a self-dispersible pigment and a thiol compound having two thiol groups were included in the aqueous medium and the core of the capsule contains a tetrafunctional allylether as polymerizable compound having an alkyne group or an ethylenically unsaturated group.

Preparation of the Capsule Dispersion NANO-1

First a solution SOL-A was prepared by dissolving the compounds according to Table 4 in 10.00 g ethyl acetate.

TABLE 4

| Compounds in SOL-A | Amount (g) |
|---|---|
| D110N | 20.00 |
| APE | 16.80 |
| ITX | 3.00 |
| TPO-L | 3.00 |
| EHA | 3.00 |
| Irgacure ™ 379 | 3.00 |

Then a solution SOL-B was prepared by dissolving the compounds according to the Table 5 in 78.00 g water.

TABLE 5

| Compounds in SOL-B | Amount (g) |
|---|---|
| ACP 70 | 7.00 |
| L-lysine | 4.00 |
| E1010 | 0.09 |

The solution SOL-A was emulsified in solution SOL-B using an Ultra-Turrax at 12,000 rpm for 5 minutes. An additional 52.00 g of water was added and the ethyl acetate and part of the water was removed under reduced pressure at 65° C., while gradually reducing the pressure from 500 mbar to 120 mbar. After removing the ethyl acetate and part of the water, extra water was added to obtain a total weight of 145 g for the capsule dispersion NANO-1. The average size of the capsules was determined and found to be 532 nm.

Preparation of the Aqueous UV Curable Inkjet Ink UV-1

The above prepared capsule dispersion NANO-1 was used to formulate the aqueous UV curable inkjet ink UV-1 according to Table 6. The weight percentage (wt %) of each component was based on the total weight of the ink.

TABLE 6

| w % of component | UV-1 |
|---|---|
| NANO-1 | 84 |
| THIO-1 | 10.5 |
| CYAN-1 | 5.5 |

Evaluation and Results

The aqueous UV curable inkjet ink UV-1 was coated on an aluminium plate using 20 μm wired bar. The coating was dried, followed by curing using a Fusion DRSE-120 conveyer, equipped with a Fusion VPS/1600 lamp (D-bulb). The sample was three times cured using a belt speed of 20 m/min and at full power of the lamp.

The dry rub resistance of a cured and uncured sample was evaluated and the results are shown in Table 7

TABLE 7

| Sample | Dry rub resistance |
|---|---|
| INV-1 uncured | 3 |
| INV-1 cured | 0 |

From Tab 7 it becomes clear that encapsulated thiol ene based technology is a very effective technology to design aqueous UV curable inkjet inks UV-1.

REFERENCE SIGNS LIST

Figure 2:
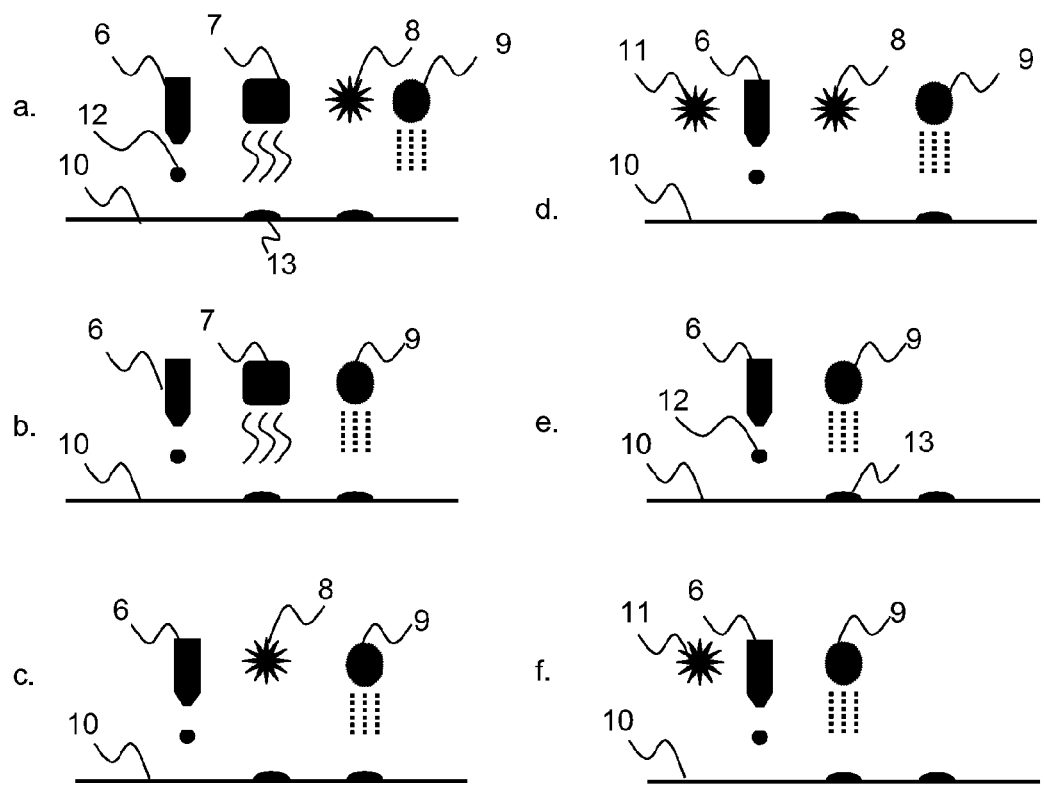
FIG. 2 gives six examples a. to g. of inkjet printing modes that can be used in accordance with the invention.
Figure 3:
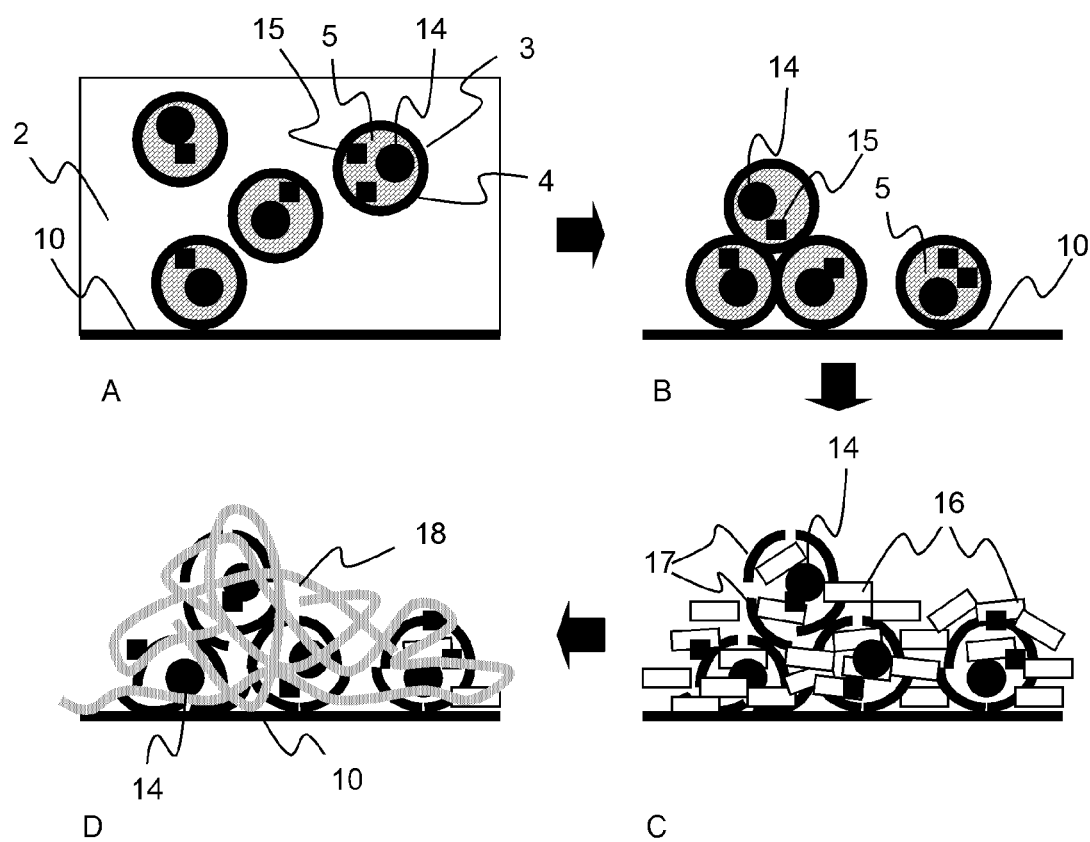
FIG. 3 illustrates the mechanism believed to occur in three steps from A to D. In a first step A to B, the aqueous medium (2) is removed by drying so that capsules (3) having a polymeric shell (4) with a core (5) containing a colorant (14) and a photoinitiator (15) remain on the substrate (10). In the second step B to C, the capsules (3) are opened so that polymerizable compounds (18) flow from the core (5) through the permeable polymeric shell (17). In the last step C to D, the polymerizable compounds (18) are cured by UV radiation into a polymerized compound (18).

Table 8 shows the reference numerals used in the drawings of FIGS. 1 to 3.

TABLE 8

| 1 | Aqueous UV curable inkjet ink |
|---|---|
| 2 | Aqueous medium |
| 3 | Capsules |
| 4 | Polymeric shell |
| 5 | Core |
| 6 | Inkjet print head |
| 7 | Dryer |
| 8 | Infrared radiation source |
| 9 | UV curing device |
| 10 | Substrate |
| 11 | Pre-heating device |

TABLE 8-continued

| 12 | Ink droplet |
| 13 | Jetted ink droplet |
| 14 | Colorant |
| 15 | Photoinitiator |
| 16 | Polymerizable compound |
| 17 | Permeable polymeric shell |
| 18 | Polymerized compound |

The invention claimed is:

1. An aqueous UV free radical curable inkjet ink comprising:
an aqueous medium;
capsules including a polymeric shell surrounding a core including one or more polymerizable compounds having an alkyne group or an ethylenically unsaturated group;
a free radical photoinitiator;
a thiol compound including at least two thiol groups; and
a dispersing group covalently bonded to the polymeric shell; wherein
the only dispersing group covalently bonded to the polymeric shell is selected from the group consisting of a carboxylic acid or a salt thereof, a sulfonic acid or a salt thereof, a phosphoric acid ester or a salt thereof, a phosphonic acid or a salt thereof, an ammonium group, a sulfonium group, and a phosphonium group;
the aqueous UV free radical curable inkjet ink does not contain a polyether-modified silicone oil; and
wherein the aqueous UV free radical curable inkjet ink does not contain acrylates or methacrylates as polymerizable compounds.

2. The aqueous UV free radical curable inkjet ink according to claim 1, further comprising a self-dispersible colorant in the aqueous medium, or a color pigment in the core of the capsules.

3. The aqueous UV free radical curable inkjet ink according to claim 1, wherein the thiol compound includes a secondary thiol group, or the thiol compound is an inorganic pigment including the at least two thiol groups on a surface of the inorganic pigment.

4. The aqueous UV free radical curable inkjet ink according to claim 1, wherein the thiol compound is a silicon-based thiol compound.

5. The aqueous UV free radical curable inkjet ink according to claim 1, wherein the free radical photoinitiator is a polymerizable free radical photoinitiator or a polymeric free radical photoinitiator.

6. The aqueous UV free radical curable inkjet ink according to claim 1, wherein the one or more polymerizable compounds having the alkyne group or the ethylenically unsaturated group are selected from the group consisting of allyl ethers, and alkyne compounds.

7. The aqueous UV free radical curable inkjet ink according to claim 1, further comprising an inorganic pigment including ethylenically unsaturated polymerizable groups on a surface of the inorganic pigment.

8. The aqueous UV free radical curable inkjet ink according to claim 1, wherein the polymeric shell includes a polymer selected from the group consisting of a polyamide, a melamine based polymer, a poly(urea-urethane) polymer, and copolymers thereof.

9. An inkjet printed substrate comprising:
a substrate; and
a cured layer of the aqueous UV free radical curable inkjet ink according to claim 1 on the substrate.

10. The inkjet printed substrate according to claim 9, wherein the substrate is selected from a polyethylene terephthalate substrate, a polylactic acid substrate, a PVC substrate, a textile substrate, a leather substrate, paperboard substrate, a corrugated substrate, and a wood substrate.

11. An inkjet printing device comprising more than one aqueous UV free radical curable inkjet ink according to claim 1.

12. An inkjet printing method comprising, in order, at least the steps of:
jetting at least one aqueous UV free radical curable inkjet ink according to claim 1 on a substrate;
applying heat and/or infrared light to the at least one aqueous UV free radical curable inkjet ink jetted on the substrate; and
applying UV light to the at least one aqueous UV free radical curable inkjet ink jetted on the substrate.

13. The inkjet printing method according to claim 12, wherein the step of applying infrared light includes applying infrared light from a NIR or a SWIR source, and the step of applying UV light includes applying UV light from UV LEDs.

14. An aqueous UV free radical curable inkjet ink comprising:
an aqueous medium;
capsules including a polymeric shell surrounding a core including one or more polymerizable compounds having an alkyne group or an ethylenically unsaturated group;
a free radical photoinitiator; and
a thiol compound including at least two thiol groups; wherein
the one or more polymerizable compounds are selected from the group consisting of vinyl carbonates, vinyl esters, vinyl carbamates, allyl ethers, allyl esters, and alkyne compounds; and
wherein the one or more polymerizable compounds are cured by UV radiation into a polymerized compound after the aqueous UV free radical curable inkjet ink is printed on a substrate.

15. The aqueous UV free radical curable inkjet ink according to claim 14, further comprising a self-dispersible colorant in the aqueous medium, or a color pigment in the core of the capsules.

16. The aqueous UV free radical curable inkjet ink according to claim 14, wherein the free radical photoinitiator is a polymerizable free radical photoinitiator or a polymeric free radical photoinitiator.

17. The aqueous UV free radical curable inkjet ink according to claim 14, wherein the polymeric shell includes a polymer selected from the group consisting of a polyamide, a melamine based polymer, a poly(urea-urethane) polymer, and copolymers thereof.

18. The aqueous UV free radical curable inkjet ink according to claim 14, wherein the aqueous UV free radical curable inkjet ink does not contain a polyether-modified silicone oil.

19. An inkjet printed substrate comprising:
a substrate; and
a cured layer of the aqueous UV free radical curable inkjet ink according to claim 14 on the substrate.

20. The inkjet printed substrate according to claim 19, wherein the substrate is selected from a polyethylene terephthalate substrate, a polylactic acid substrate, a PVC substrate, a textile substrate, a leather substrate, paperboard substrate, a corrugated substrate, and a wood substrate.

21. An inkjet printing device comprising more than one aqueous UV free radical curable inkjet ink according to claim 14.

22. An inkjet printing method comprising, in order, at least the steps of:
- jetting at least one aqueous UV free radical curable inkjet ink according to claim 14 on a substrate;
- applying heat and/or infrared light to the at least one aqueous UV free radical curable inkjet ink jetted on the substrate; and
- applying UV light to the at least one aqueous UV free radical curable inkjet ink jetted on the substrate.

23. The inkjet printing method according to claim 22, wherein the step of applying infrared light includes applying red light from a NIR or a SWIR source, and the step of applying UV light includes applying UV light from UV LEDs.

* * * * *